United States Patent
Iwamura et al.

(10) Patent No.: US 7,512,811 B2
(45) Date of Patent: Mar. 31, 2009

(54) ENCRYPTION/DECRYPTION METHOD FOR DATA LIMITED IN VALUE RANGE, APPARATUS AND PROGRAM THEREFOR

(75) Inventors: Keiichi Iwamura, Kanagawa (JP); Yuji Suga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 703 days.

(21) Appl. No.: 10/753,319

(22) Filed: Jan. 9, 2004

(65) Prior Publication Data

US 2004/0170277 A1  Sep. 2, 2004

(30) Foreign Application Priority Data

Jan. 14, 2003 (JP) ............... 2003-006372
Mar. 7, 2003 (JP) ............... 2003-061617
Jun. 27, 2003 (JP) ............... 2003-184941

(51) Int. Cl.
*G06F 11/30* (2006.01)

(52) U.S. Cl. .................. 713/189; 380/28; 380/217

(58) Field of Classification Search ............... 713/189; 380/28

See application file for complete search history.

(56) References Cited

U.S. PATENT DOCUMENTS

2002/0085734 A1  7/2002  Keeney et al. ............... 382/100

FOREIGN PATENT DOCUMENTS

EP  1 126 356 A2  8/2001

OTHER PUBLICATIONS

Min Wu; Yinian Mao, "Communication-friendly encryption of multimedia," Multimedia Signal Processing, 2002 IEEE Workshop on , vol., No., pp. 292-295, Dec. 9-11, 2002.*

Natu, A.; Taubman, D., "Unequal protection of JPEG2000 codestreams in wireless channels," Global Telecommunications Conference, 2002. Globecom '02. IEEE, vol. 1, No., pp. 534-538 vol. 1, Nov. 17-21, 2002.*

* cited by examiner

*Primary Examiner*—Kimyen Vu
*Assistant Examiner*—Yogesh Paliwal
(74) *Attorney, Agent, or Firm*—Fitzpatrick, Cella, Harper & Scinto

(57) ABSTRACT

On an encrypted object code obtained by encrypting an object code, there is discriminated whether an inhibited code defined in data format is present in a code concerning such encrypted object code, and, in case such inhibited code is judged absent, the encrypted object code is determined as an encryption result of the object code.

14 Claims, 23 Drawing Sheets

ENCRYPTION/DECRYPTION METHOD FOR DATA LIMITED IN VALUE RANGE, APPARATUS AND PROGRAM THEREFOR

BACKGROUND OF THE INVENTION

1. Field of the Invention

The present invention relates to an encryption/decryption method for data, and more particularly to a method, an apparatus and a program for encrypting/decrypting image data including a specified marker code in the format.

2. Related Background Art

With recent rapid progress and pervasiveness of computers and networks, digitization is spreading over various information such as character data, image data, audio data etc. While digital information is free from deterioration for example by the lapse of time and can be constantly stored in a complete state, it is easily reproducible and protection of copyright is becoming a serious issue. For this reason, security technologies for copyright protection are rapidly becoming important.

One of the technologies for copyright protection is an "encryption technology". For encrypting digital contents such as image data, there is known a common key encryption method (also called secret key encryption method, symmetrical encryption method or common encryption method) in which a transmitter and a receiver shares a same encrypting key in secret. Such common key encryption method can be divided into a block encryption in which every character train (block) of an appropriate length is encrypted by a same key, and a stream encryption in which the key is changed for every character train or every bit. Among the block encryption methods, there are well known DES (data encryption standard) and AES (advanced encryption standard).

Among the stream encryption methods, there are known Vigenere cipher utilizing a polyalphabetic substitution, Vernam cipher utilizing a one time pad etc. (Ikeno and Koyama, "Modern Cipher Theory", Electronic Information Communication Society (1986), Chapters 2 and 4). Therefore, the copyright protection by encryption of the entire image data can be easily achieved by one of these common key encryption methods. More specifically, the transmitter and the receiver share an encryption key, and the image data encrypted by the transmitted are decrypted with such key by the receiver.

On the other hand, as a high efficiency encoding method for compressing image data, there is widely employed the JPEG method recommended by ISO and ITU-T as an international standard encoding method for a still image. The JPEG method is based on a discrete cosine transformation, but is associated with a drawback that a block-shaped distortion is generated when the compression rate is increased. Therefore, in order to meet a requirement for a higher resolution of the image and to realize a higher compression rate, an encoding method utilizing a discrete wavelet transformation, different from the aforementioned discrete cosine transformation, is proposed and is being standardized as JPEG 2000.

FIG. 1 is a functional block diagram of a JPEG 2000 encoder. An input image is at first subjected to a subband decomposition by a discrete wavelet transformation (DWT) (101), and is then quantized (102). FIG. 2 shows an example of a subband decomposition with a decomposition level of 2 (resolution level=3), and the resolution levels exist from level 0 to level 2. A coefficient belonging to a lower resolution level contains information of a lower frequency. A quantized wavelet coefficient is encoded by an EBCOT algorithm. Such algorithm will be explained in the following in following five parts of a code block division (103), a coefficient modeling (104), an arithmetic encoding, (105) and a rate control (106), a layer formation (107), and a packet generation (108).

(1) Code Block Division

Each subband is divided into square blocks (for example 64×64), called code blocks. Such code blocks are independently encoded.

(2) Coefficient Modeling

For a wavelet coefficient stream of each code block, a coefficient modeling is executed based on a bit plane. In this manner there is generated an embedded code stream in which coefficient bits are arranged in an order of importance. Each of all the bit planes from MSB to LSB is decomposed into three subbit planes (paths) according to the context. A boundary of each subbit plane is called a truncation point, which constitutes a minimum unit for data discarding later.

(3) Arithmetic Encoding and Rate Control

An adaptive arithmetic encoding is executed on the embedded code stream generated by the coefficient modeling. Thereafter, the arithmetic coded stream is suitably cut off at the truncation point constituting the boundary of the subbit plane, thereby obtaining a desired bit rate.

(4) Layer Formation

In case display is required in succession in plural image qualities, namely in case an NSR scalable property is required, a layer formation of the codes is then executed. Each layer includes a part of the embedded codes of each code block. A higher layer includes a more important portion in the image reproduction.

(5) Packet Generation

Each layer is divided into plural units called bodies, and each is given a header information to generate a packet. Each body has information of a corresponding resolution level. Therefore a total number of the generated packets is a product of a number of layers and a number of resolution levels. The header information includes a length of the arithmetic code stream of each code block, a number of subbit planes etc. A final JPEG 2000 code stream is obtained by collecting all the packets and attaching a global header information as shown in FIG. 4. However, JPEG 2000 defines that various header information mentioned in the foregoing and the subbit plane constituting a minimum unit of the data division is a size of an integral multiple of a byte.

As explained in the foregoing, digital image data are associated with a security issue, which can be resolved, in case of encryption of the entire image, by the aforementioned encryption methods such as DES or AES. In such case, however, a decrypting operation results in a decryption of the entire image, and a partial protection cannot be obtained. It is nevertheless possible to encrypt a high resolution portion only (level 1 and higher in FIG. 2) while leaving the level 0 unencrypted, thereby disclosing the image of level 0 of a low resolution but protecting the entire image of a high resolution. In such case, however, since a portion other than the high resolution portion to be encrypted is in an ordinary code stream of JPEG 2000 format, the DES or ABS method cannot be simply applied for encrypting the high resolution portion.

This is because a partial encryption of a JPEG 2000 code stream is associated with a restriction on the marker code. The marker code is a code of a special meaning in the JPEG 2000, and a false marker code, if generated by the encryption, may hinder a proper reproduction. More specifically, in a compressed data portion (body) shown in FIG. 4, a marker code has a function similar to an inhibited code of which generation is inhibited.

In the JPEG 2000, the marker code means a marker having a value of FF90h to FFFFh and a marker segment code. The marker is a code storing definition information. It is represented by 2 bytes, of which a first byte is FFh. According to the purpose, the marker is represented by 2-byte code FFxxh. On the other hand, the market segment is constituted of a marker and an ensuing parameter. Four markers only, namely SOC (FF4Fh: start of code stream), EOC (FFD9h: end of code stream), SOD (FF93h: start of data) and EPH (FF92h: end of packet header) are independent codes, and any other marker is a part of the marker segment. Hereafter, the markers and the market segments are collectively called markers. IN JPEG 2000, a marker in a range of FF90h to FFFFh is given two particular meanings. Firstly, such marker means a partition in a code stream. It is thus possible to define a position of a packet and a packet header. Secondly, such marker does not exist in the compressed data themselves (body shown in FIG. 4). The JPEG 2000 encoder is so designed as not to generate such code. Therefore, in the aforementioned partial encryption of the JPEG 2000 data, it is necessary to avoid generation of such 2-byte marker code of FF90h-FFFFh.

Another data format in which a usable data range is restricted is PNG (portable network graphics). PNG is a new image format proposed by a standardizing organization W3C as one of image formats usable in a browser. Specifications of PNG can be found at the w3.org wetsite. A file format described by PNG is constituted of a PNG signature and an ensuing group of data clusters called chunks. An example of the PBG signature is 8-byte data "137 80 78 71 13 10 26 10" (decimal presentation) which are always attached at the beginning of the PNG file.

A chunk is constituted of a stream of four parts, which are a chunk data length (4 bytes), a chunk format code (4 bytes fixed), chunk data (unfixed length) and a CRC (4 bytes). The chunk data length information is 4-byte data indicating a number of bytes of the chunk data area. The chunk format is 4-byte code indicating a format, and data defined according to such format are stored in the chunk data area. The data length of the chunk data area may also be 0. At the end, 4-byte CRC data, calculated as padding data calculated by CRC (cyclic redundancy check) algorithm for the chunk data area, are attached.

For the chunk format code, there can only be used ASCII characters of upper case and lower case (A to Z, a to z). Stated differently, value ranges of 65 to 90 and 97 to 122 in decimal presentation. Therefore, in case of encrypting a part of the PNG code, it is necessary to cautiously handle such chunk format code, so as not to generate a code outside such value ranges.

SUMMARY OF THE INVENTION

In consideration of the foregoing, an object of the present invention is, in case of applying an encrypting or decrypting process on data within a predetermined value range, to always obtain result data within a predetermined value range.

According to one aspect, the present invention which achieves these objectives relates to an encryption method including an encryption step of encrypting a code, an encryption result discrimination step of discriminating whether, in a code of an encrypted object code obtained by encrypting an object code by the encryption step, there is generated a code of a value within a predetermined range, and an encryption result determination step, which, in case the encryption result discrimination step judges that a code within the predetermined range is not generated, determines the encrypted object code as an encryption result of the object code.

According to another aspect, the present invention which achieves these objectives relates to a decryption method including a decryption step of decrypting a code, a decryption result discrimination step of discriminating whether, in a code of a decrypted object code obtained by decrypting an object code by the decryption step, there is generated a code of a value within a predetermined range, and a decryption result determination step, which, in case the decryption result discrimination step judges that a code within the predetermined range is not generated, determines the decrypted object code as a decryption result of the object code.

According to still another aspect, the present invention which achieves these objectives relates to an encryption apparatus including encryption means which encrypts a code, encryption result discrimination means which discriminates whether, in a code of an encrypted object code obtained by encrypting an object code by the encryption means, there is generated a code of a value within a predetermined range, and encryption result determination means, which, in case the encryption result discrimination means judges that a code within the predetermined range is not generated, determines the encrypted object code as an encryption result of the object code.

According to a further aspect, the present invention which achieves these objectives relates to a decryption apparatus including decryption means which decrypts a code, decryption result discrimination means which discriminates whether, in a code of a decrypted object code obtained by decrypting an object code by the decryption means, there is generated a code of a value within a predetermined range, and decryption result determination means, which, in case the decryption result discrimination means judges that a code within the predetermined range is not generated, determines the decrypted object code as a decryption result of the object code.

According to a further aspect, the present invention which achieves these objectives relates to a computer readable encryption program including an encryption step of encrypting a code, an encryption result discrimination step of discriminating whether, in a code of an encrypted object code obtained by encrypting an object code by the encryption step, there is generated a code of a value within a predetermined range, and an encryption result determination step, which, in case the encryption result discrimination step judges that a code within the predetermined range is not generated, determines the encrypted object code as an encryption result of the object code.

According to a further aspect, the present invention which achieves these objectives relates to a computer readable decryption program including a decryption step of decrypting a code, a decryption result discrimination step of discriminating whether, in a code of a decrypted object code obtained by decrypting an object code by the decryption step, there is generated a code of a value within a predetermined range, and a decryption result determination step, which, in case the decryption result discrimination step judges that a code within the predetermined range is not generated, determines the decrypted object code as a decryption result of the object code.

Other objectives and advantages besides those discussed above shall be apparent to those skilled in the art from the description of a preferred embodiment of the invention which follows. In the description, reference is made to accompanying drawings, which forms a part thereof, and which illustrate an example of the invention. Such example, however, is not exhaustive of the various embodiments of the invention, and therefore reference is made to the claims which follows the description for determining the scope of the invention.

DESCRIPTION OF THE PREFERRED EMBODIMENTS

In the following, a preferred embodiment of the present invention will be explained with reference to accompanying drawings.

First Embodiment

At first, DES is considered as an encryption process to be employed. The DES is constituted of basic operations:
1: dividing data into blocks of a 64-bit length; and
2: encrypting each block with a key of a 64-bit length;
but has four modes of ECB, CB, OFB and CFB according to the method of use of the block and the key.

A basic mode of DES is ECB (electronic code block). This mode executes the aforementioned basic operations without change. More specifically, after the data are divided into blocks, each block is encrypted with a secret key, and these blocks are connected in an original order. In a CBC (cipher block chaining) mode, an XOR (exclusive logic sum) of an encrypted preceding block and a yet unencrypted current block is calculated and is encrypted with the secret key. As indicated by a word "chaining", the encryption of the blocks is executed in "chained" manner. In a CFB (cipher feedback) mode, a part (m bits) of an encryption result of a preceding block is fed back as a value for calculating an XOR with m bits of a next block. Therefore, in the CBC and CRF modes, a bit error generated in a block affects the encryption in the succeeding blocks. In an OFB (output feedback) mode, a certain initial value is encrypted as a first block to generate a cipher text, and such cipher text (or a part thereof) is employed as an input for a next cipher text and such part (m bits) is used as a random number for calculating an XOR with data of corresponding m bits. Owing to such system, a bit error in a block does not affect the encryption in other blocks. A term "output feedback" is derived from a fact that a cipher output generated in a preceding block is fed back as a parameter to be used in a next block for generating a cipher output. In each of the foregoing modes, an appropriate selection of m bits allows to realize an encryption of an arbitrary bit length.

Figure 1:
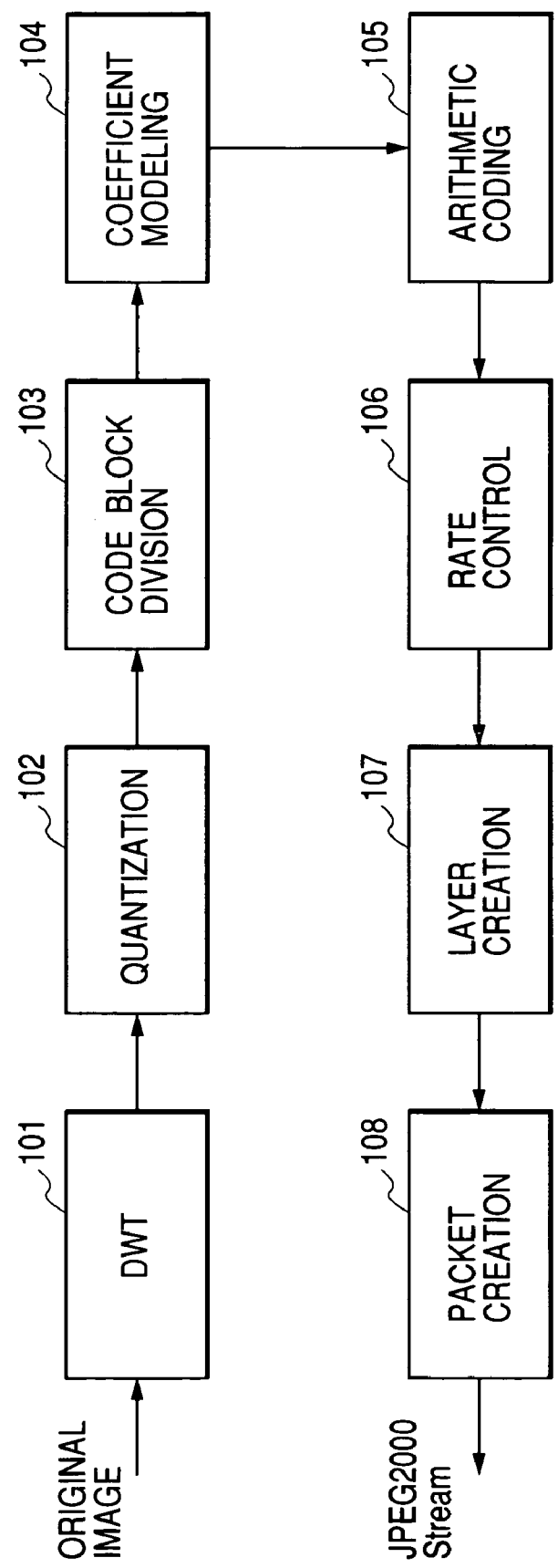
FIG. 1 is a functional block diagram of a JPEG 2000 encoder.
Figure 2:
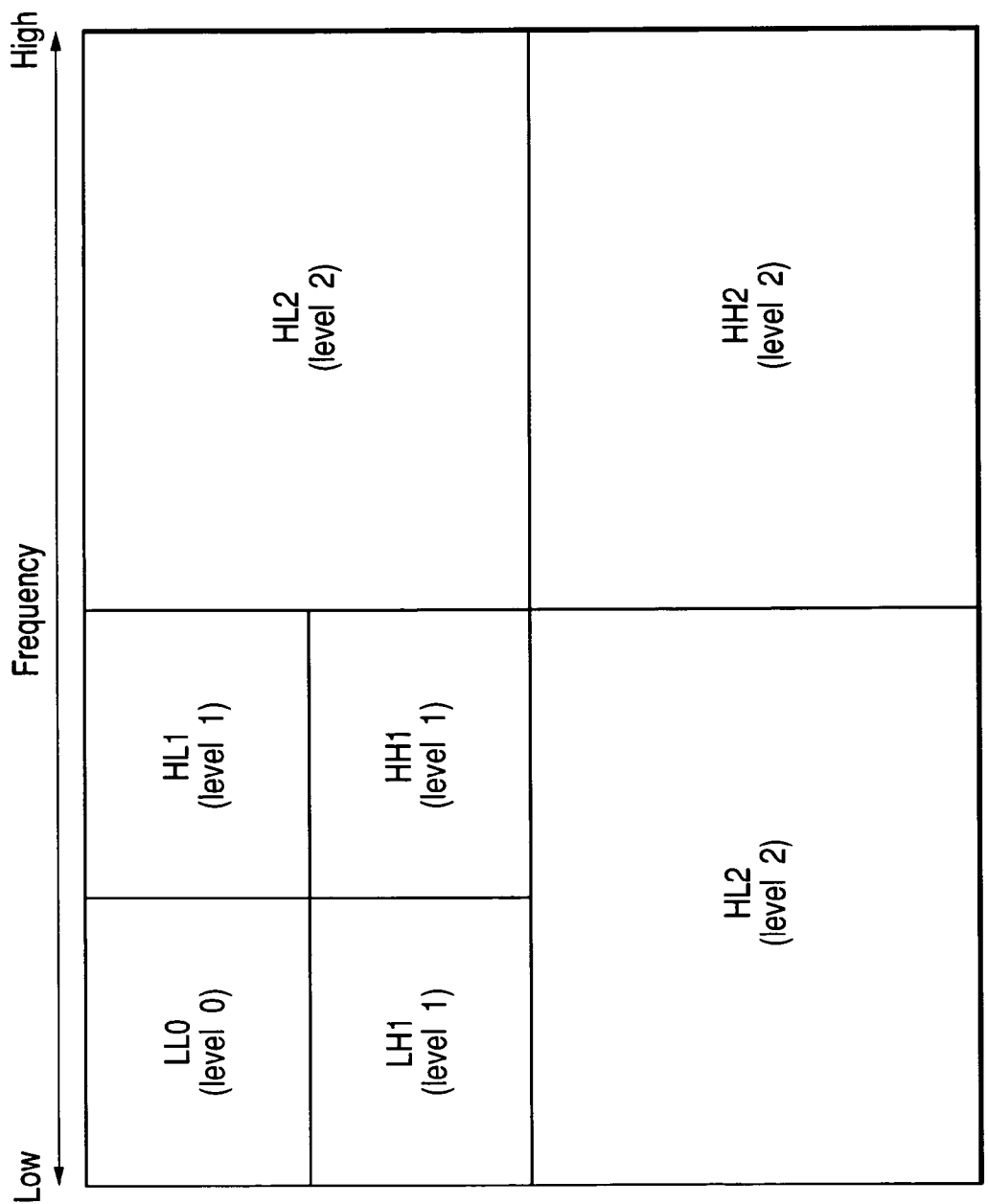
FIG. 2 is a schematic view for explaining a subband decomposition by DWT in JPEG 2000.
Figure 3:
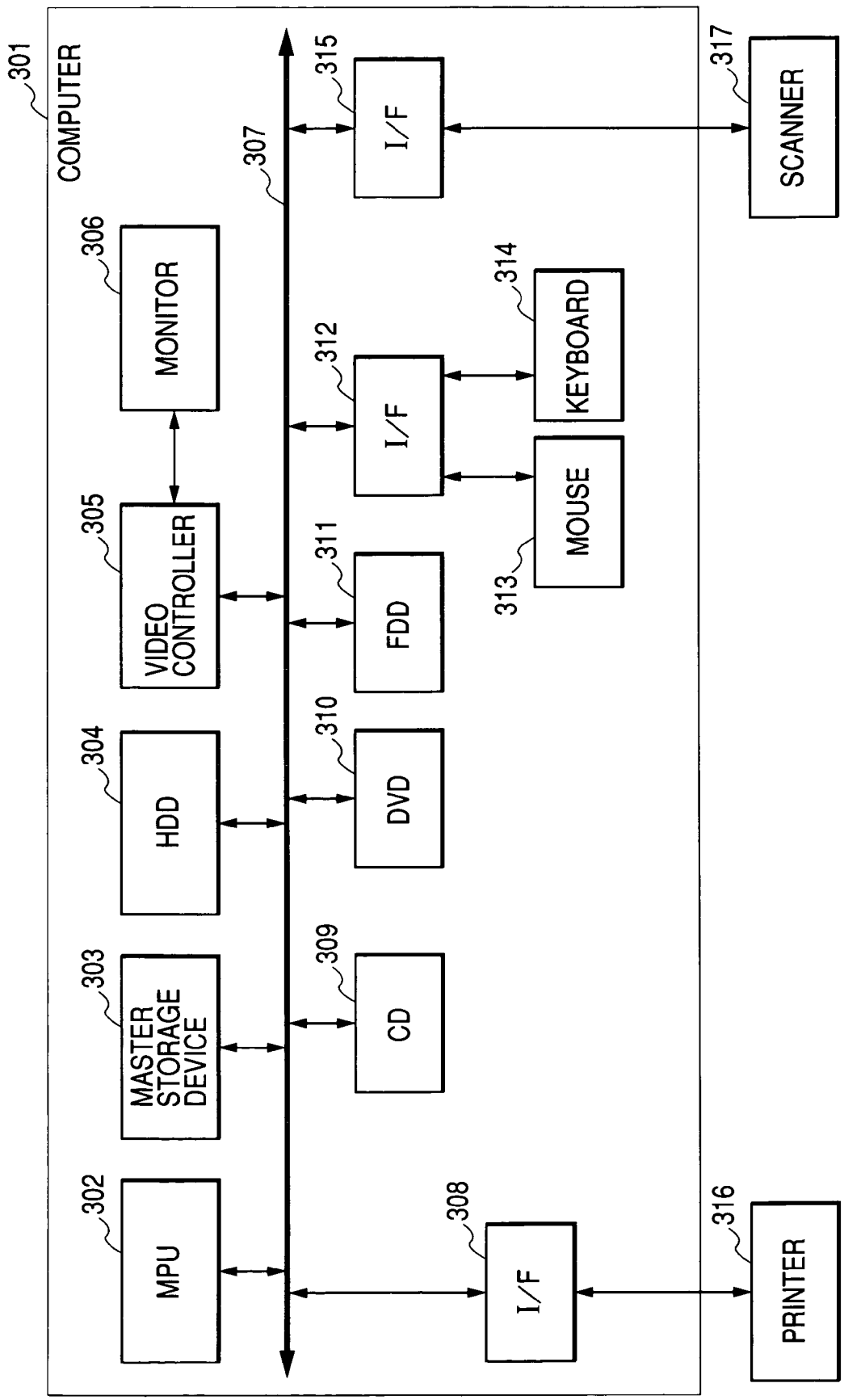
FIG. 3 is a view showing a hardware configuration of an information processing apparatus of an embodiment.

FIG. 3 is a block diagram showing a basic configuration of a computer (information processing apparatus) for realizing all the following embodiments, including the present one. In realizing a watermark information processing apparatus, it is not essential to use all the functions shown in FIG. 3.

Referring to FIG. 3, a computer 301 is an ordinary personal computer, and is capable of entering an image read by an image input apparatus 317 such as a scanner, and executing an editing or a storage thereof. It can also cause an image entered from the image input apparatus 317 to be printed by a printer 316. Also various instructions from a user are executed by an input operation from a mouse 313 or a keyboard 314.

Within the computer 301, blocks to be explained later are connected by a bus 307 to enable exchange of various data. In FIG. 3, an MPU 302 is capable of controlling the functions of various blocks in the computer 301, and executing an internally stored program. A main memory apparatus 303 temporarily stores a program or image data to be processed, for a process to be executed by the MPU 302. A hard disk (HDD) 304 is capable of in advance storing a program or image data to be transferred to the main memory apparatus 303 etc. or storing image data after processing.

A scanner interface (I/F) 315 is an I/F connected with a scanner 317 for reading an original or a film thereby generating image data, and capable of entering image data obtained in the scanner 317. A printer interface 308 is an I/F connected with a printer 316 for printing image data, and capable of transmitting image data obtained to be printed to the printer 316.

A CD drive 309 is capable of reading or writing data from or into a CD (CD-R/CD-RW) constituting one of external memory media. An FDD drive 311, like the CD drive 309, is capable of reading or writing data from or into an FDD. A DVD drive 310, like the FDD drive 311, is capable of reading or writing data from or into a DVD. In case an image editing program or a printer driver is stored in CD, FDD, DVD etc., such program is installed in the HDD 304 and is transferred to the main memory apparatus 303 when required.

An interface (I/F) 312 is connected with the mouse 313 and the keyboard 314 for accepting an input instruction therefrom. A monitor 306 is a display apparatus capable of displaying an extraction result and a process of watermark information. Also a video controller 305 is used for transmitting display data to the monitor 306.

The present invention may be applied to a system constituted of plural equipment (such as a host computer, an interface equipment, a reader, a printer etc.), or an apparatus constituted of a single equipment (for example a copying apparatus, a facsimile apparatus etc.).

Figure 5:
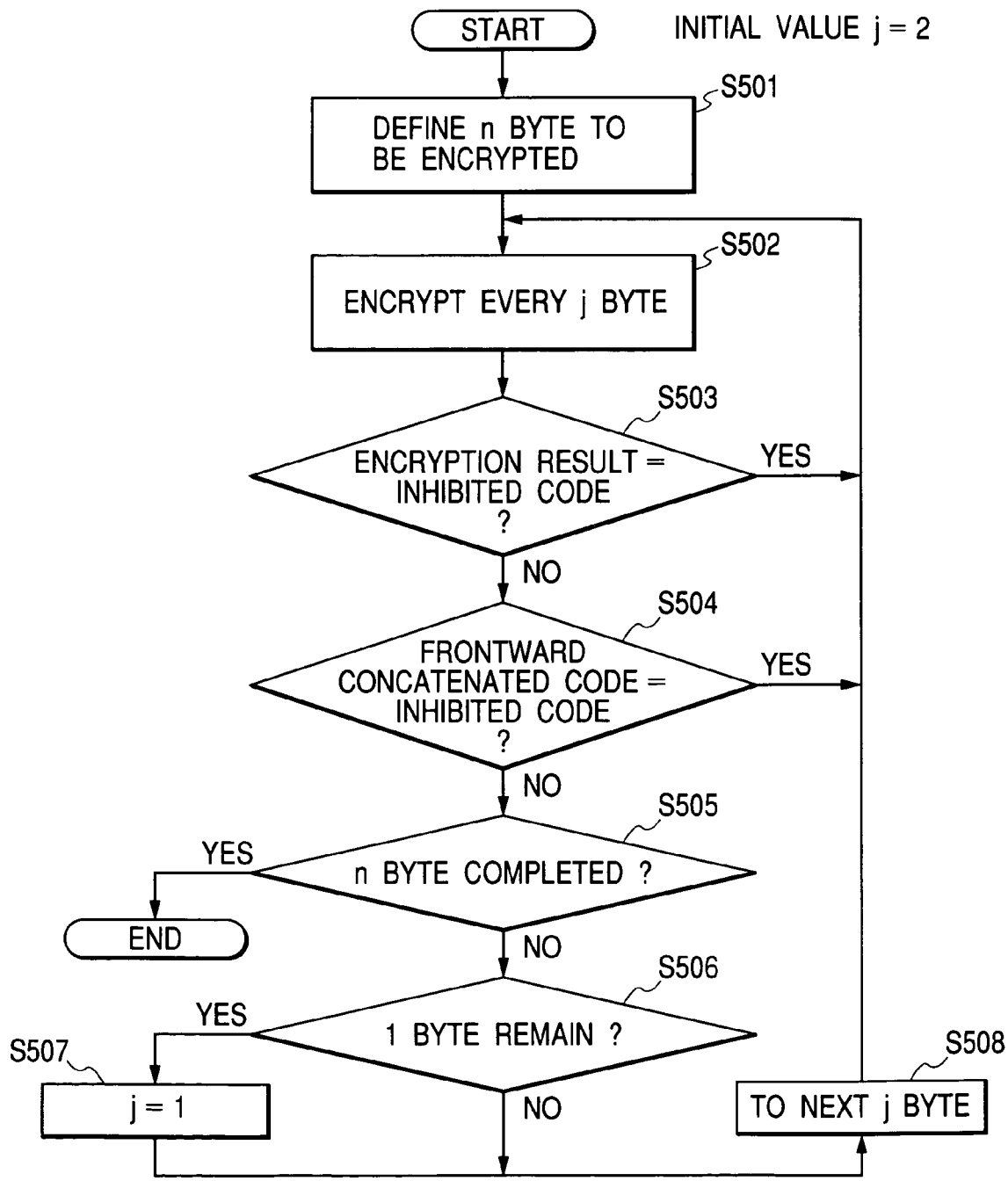
FIG. 5 is a flow chart showing an encryption process in a first embodiment.

FIG. 5 shows a flow chart of an encryption process. This flow can be realized by executing a program loaded in the main memory apparatus 303 based on an input instruction from the computer shown in FIG. 3, particularly from the mouse 313 or the keyboard 314, for example by the MPU 302. Also there is employed an initial value j=2.

Figure 4:
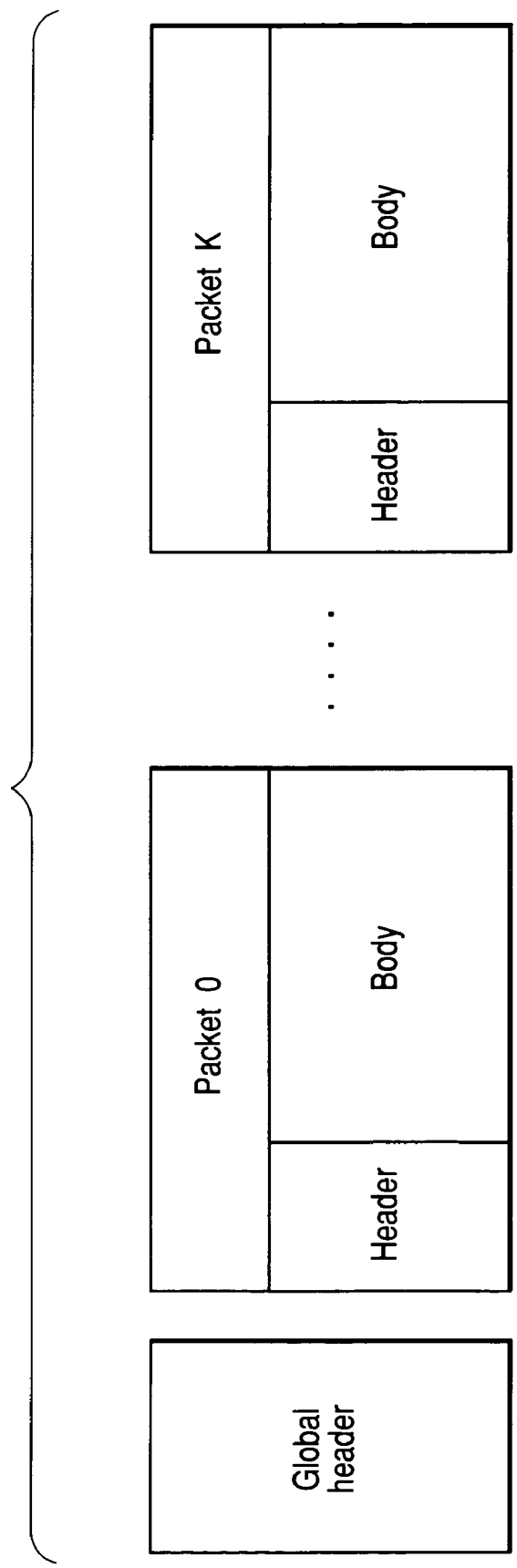
FIG. 4 is a conceptual view showing a configuration of a JPEG 2000 stream.

At first there are determined n bytes to be encrypted in the JPEG 2000 stream (step S501). There are assumed continuous n bytes in compressed data (data of the body shown in FIG. 4) not containing marker codes of FF90h-FFFFh. The JPEG 2000 stream constituting the origin may be stored in advance in the hard disk 304, or various memory media connected to the CD drive 309, the DVD drive 310, the FDD drive 311 etc. or may be obtained by executing a JPEG 2000 compression program loaded in the main memory apparatus 303 by the MPU 302 etc., or may be transmitted through a network not shown in FIG. 3.

Then 2 bytes are taken out from the head of n bytes, and are encrypted (step S502). Such encryption can be achieved by the aforementioned CFB or OFB mode of DES. Then there is discriminated whether the encryption result is a marker code of FF90h-FFFFh (inhibited code) (step S503). In case of an inhibited code, the flow returns to the step S502 for executing the encrypting process again on the encryption result.

Then, in case the encryption result is not an inhibited code, a byte in the latter part of the encryption result positioned in front is connected with a byte in the front part of the current encryption result to form a code (hereinafter called frontward concatenated code) and there is discriminated whether such code is an inhibited code (step S504).

In case it is identified as an inhibited code, the flow returns to the step S502 for repeating the encryption process. This is to prevent presence of an inhibited code even in a frontward or backward concatenated state since the JPEG 2000 stream has a minimum unit of one byte. Since two bytes in the present case are initial ones without a preceding encryption result, they are not an inhibited code and the flow proceeds to a next step S505. Then there is discriminated whether the second byte is a final n-th byte (step S505). The flow is terminated if it is the n-th byte. If not, there is discriminated whether the second byte is an (n−1)th byte, namely whether there remains one byte (step S506).

In case there remains one byte, there is assumed a value j=1 (step S507). In the present example, since it is not an n-th byte nor an (n−1)th byte, next two bytes are taken out (step S508). Then the process of the steps S502 to S508 is repeated on such two bytes. For example, in case of n=4, the second byte corresponds to a 4th byte which is equal to n, the flow is terminated at the step S505. Also in case of n=5, since the step S506 discriminates that one byte is remaining, there is assumed j=1 and a next 5th byte alone is taken out (step S507).

In this case, such 1 byte only is encrypted in the step S502. Such 1-byte encryption can be achieved similarly with the aforementioned CFB or OFB mode of DES. In this case, since the encryption result is not a 2-byte code, it is not recognized as an inhibited code in the step S503. Then there is discriminated whether a frontward concatenated code is an inhibited code (step S504). In case the frontward concatenated code is an inhibited code, the flow returns to the step S502 for executing the encryption process again on the encryption result. Then there is discriminated whether such byte is a final n-th byte (step S505). Since n=5 in the present case, the flow is terminated.

Figure 6:
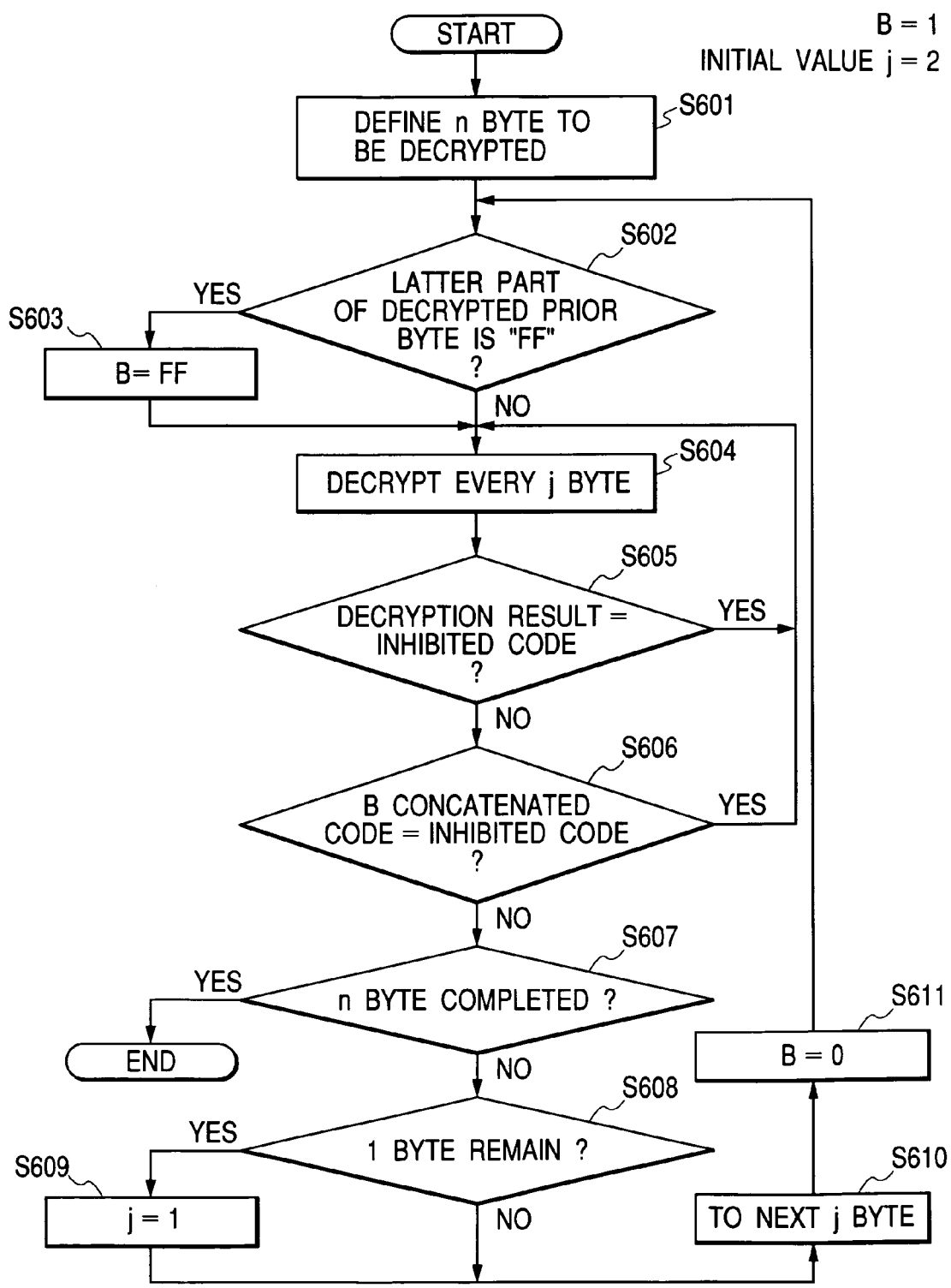
FIG. 6 is a flow chart showing a decryption process in the first embodiment.

FIG. 6 shows a flow chart of a decryption process. This flow can also be realized by executing a program loaded in the main memory apparatus 303 based on an input instruction from the computer shown in FIG. 3, particularly from the mouse 313 or the keyboard 314, for example by the MPU 302. Also there are assumed initial values j=2 and B=1.

At first there are determined n bytes to be decrypted in the JPEG 2000 stream (step S601). Such portion to be decrypted is a portion encrypted by the encrypting process shown in FIG. 5, and such portion is assumed to be known prior to the decrypting process shown in FIG. 6. The JPEG 2000 stream to be decrypted may be stored in advance in the hard disk 304, or various memory media connected to the CD drive 309, the DVD drive 310, the FDD drive 311 etc. or may be obtained by executing a JPEG 2000 compression program loaded in the main memory apparatus 303 and the encrypting program shown in FIG. 5 by the MPU 302 etc., or may be transmitted through a network not shown in FIG. 3.

Then there is discriminated whether 1 byte in the latter part of preceding 2 bytes prior to decryption is FF (step S602). In case it is FF, there is assumed a value B=FF (step S603). Since two bytes in the present case are initial ones without a preceding value prior to decryption, B=0 is retained. Then 2 bytes taken out are decrypted (step S604). Such decryption can be achieved by the aforementioned CFB or OFB mode of DES. In case the result of decryption a marker code of FF90h-FFFFh (inhibited code), the flow returns to the step S604 for executing the decryption process again on the decryption result.

Since the compressed data (body in FIG. 4) constituting the final decryption result contain no inhibited code and a multiple encryption is adopted in case the encryption result in the encryption process shown in FIG. 5 includes an inhibited code, a decryption result including an inhibited code means an encrypted result and requires a decryption again. Then, in case the decryption result is not an inhibited code, there is discriminated whether a code formed by connecting B in front of a byte in the former part of the decryption result (such being called B concatenated code) is an inhibited code (step S606). Since B=0 in the present case, there is no inhibited code and the flow proceeds to a step S607.

Then there is discriminated whether the second byte is a final n-th byte (step S607). The flow is terminated in case it is the n-th byte. If not, there is discriminated whether the second byte is an (n−1)th byte, namely whether there remains one byte (step S608). In case there remains one byte, there is assumed a value j=1 (step S609). In the present example, since it is not an n-th byte nor an (n−1)th byte, next two bytes are taken out (step S610), and there is assumed a value B=0 (step S611). Now, let us assume a case where the step S602 in the process of the second cycle identifies a latter byte prior to the decryption in the preceding cycle as FF. This can be confirmed by observing the JPEG 2000 stream stored in the beginning. Therefore, there is assumed B=FF (step S603).

Then two bytes taken out are decrypted (step S604). In case the decryption result is a marker code of FF90h-FFFFh (inhibited code) (step S605), the flow returns to the step S604 in order to execute the decryption process again on such decryption result. In case the decryption result is not an inhibited code, there is discriminated whether a-code formed by connecting B in front of a byte in the former part of the decryption result (such being called B concatenated code) is an inhibited code (step S606).

In case the B concatenated code is an inhibited code, the flow returns to the step S604 in order to execute a decryption process again on the decryption result. This is to prevent presence of an inhibited code even in a frontward or backward concatenated state since the JPEG 2000 stream has a minimum unit of one byte. Then there is discriminated whether the second byte is a final n-th byte (step S607). The flow is terminated if it is the n-th byte. If not, there is discriminated whether the second byte is an (n−1)th byte, namely whether there remains one byte (step S608).

In case there remains one byte, there is assumed a value j=1 (step S609). For example, in case of n=4, the second byte corresponds to a 4th byte which is equal to n, the flow is terminated at the step S607. Also in case of n=5, since the step S608 discriminates that one byte is remaining, there is assumed j=1 (step S609) and a next 5th byte alone is taken out (step S610). Then the process of the steps S602 to S608 is repeated, and the step S607 identifies n=5, whereupon the flow is terminated.

Second Embodiment

In the first embodiment, there has been shown a case where n bytes to be encrypted and decrypted are continuous. The present embodiment shows a case where n bytes to be encrypted and decrypted are not continuous. Such case includes, for example, a case of encrypting and decrypting specific bytes only in the body shown in FIG. 4, and a case of encrypting and decrypting at an interval of m bytes, in order to reduce the amount of process required for encryption and decryption.

Figure 7:
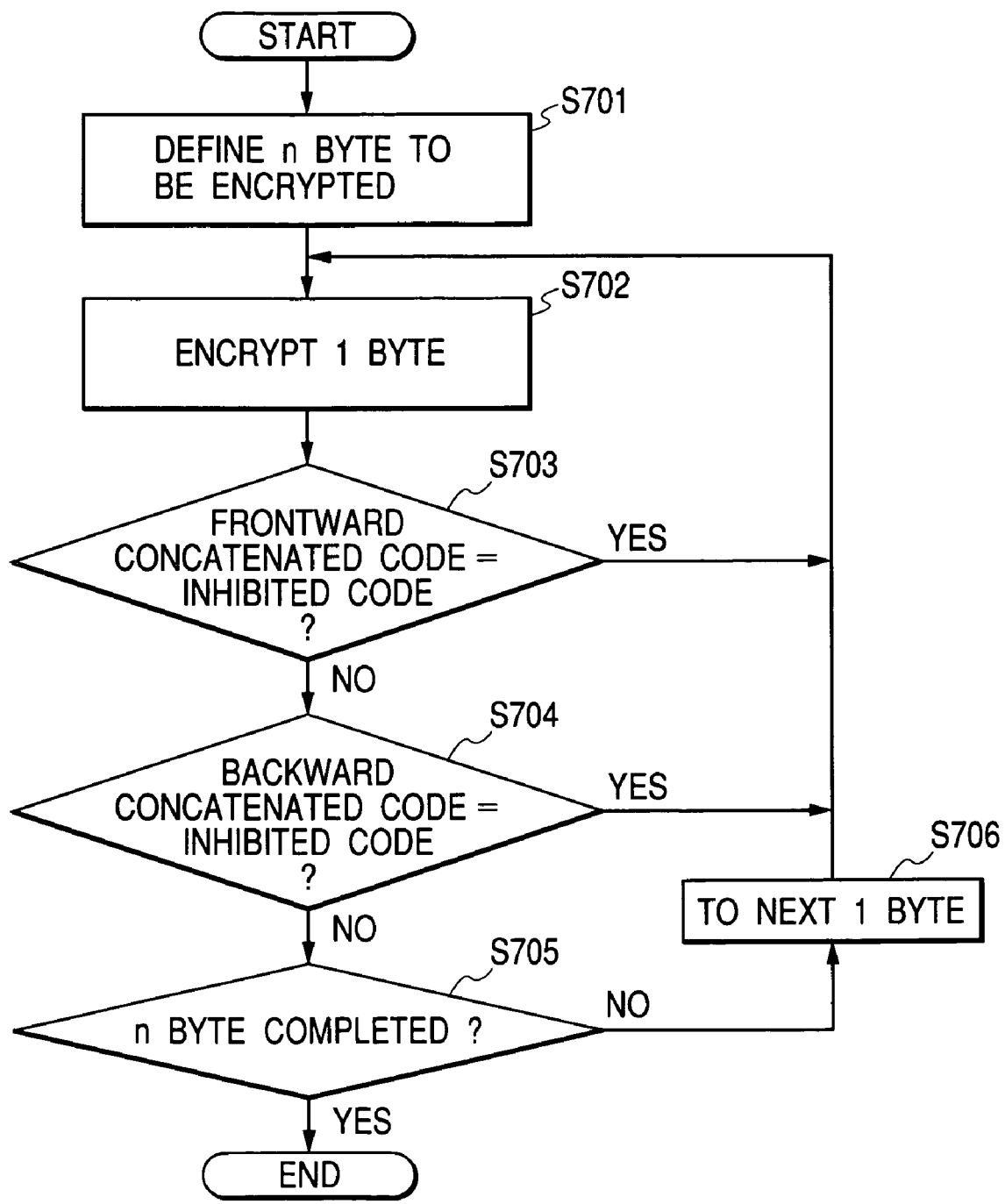
FIG. 7 is a flow chart showing an encryption process in a second embodiment.

FIG. 7 shows a flow chart of an encryption process. This flow can be realized by executing a program loaded in the main memory apparatus 303 based on an input instruction from the computer shown in FIG. 3, particularly from the mouse 313 or the keyboard 314, for example by the MPU 302.

At first there are determined n bytes to be encrypted in the JPEG 2000 stream (step S701). There are assumed continuous n bytes in compressed data (data of the body shown in FIG. 4) not containing marker codes of FF90h-FFFFh. The JPEG 2000 stream constituting the origin may be stored in advance in the hard disk 304, or various memory media connected to the CD drive 309, the DVD drive 310, the FDD drive 311 etc. or may be obtained by executing a JPEG 2000 compression program loaded in the main memory apparatus 303 by the MPU 302 etc., or may be transmitted through a network not shown in FIG. 3.

Then 1 byte is taken out from the n bytes, and is encrypted (step S702). Such encryption can be achieved by the aforementioned CFB or OFB mode of DES. Then there is discriminated whether a concatenated code, formed by such encryption result and an unencrypted byte positioned in front (frontward concatenated code), is a marker code of FF90h-FFFFh (inhibited code) (step S703).

In case of an inhibited code, the flow returns to the step S702 for executing the encryption process again on the encryption result. Then there is discriminated whether a concatenated code, formed by the encryption result and an unencrypted byte positioned behind (backward concatenated code), is an inhibited code (step S704). In case of an inhibited code, the flow returns to the step S702 for executing the encryption process again on the encryption result. Then there is discriminated whether such byte is a last n-th byte (step S705). The flow is terminated in case it is the n-th byte. If not, the flow proceeds to a next byte (step S706). Thereafter the process of the steps S702 to S706 is repeated, and the flow is terminated when n bytes are processed.

Figure 8:
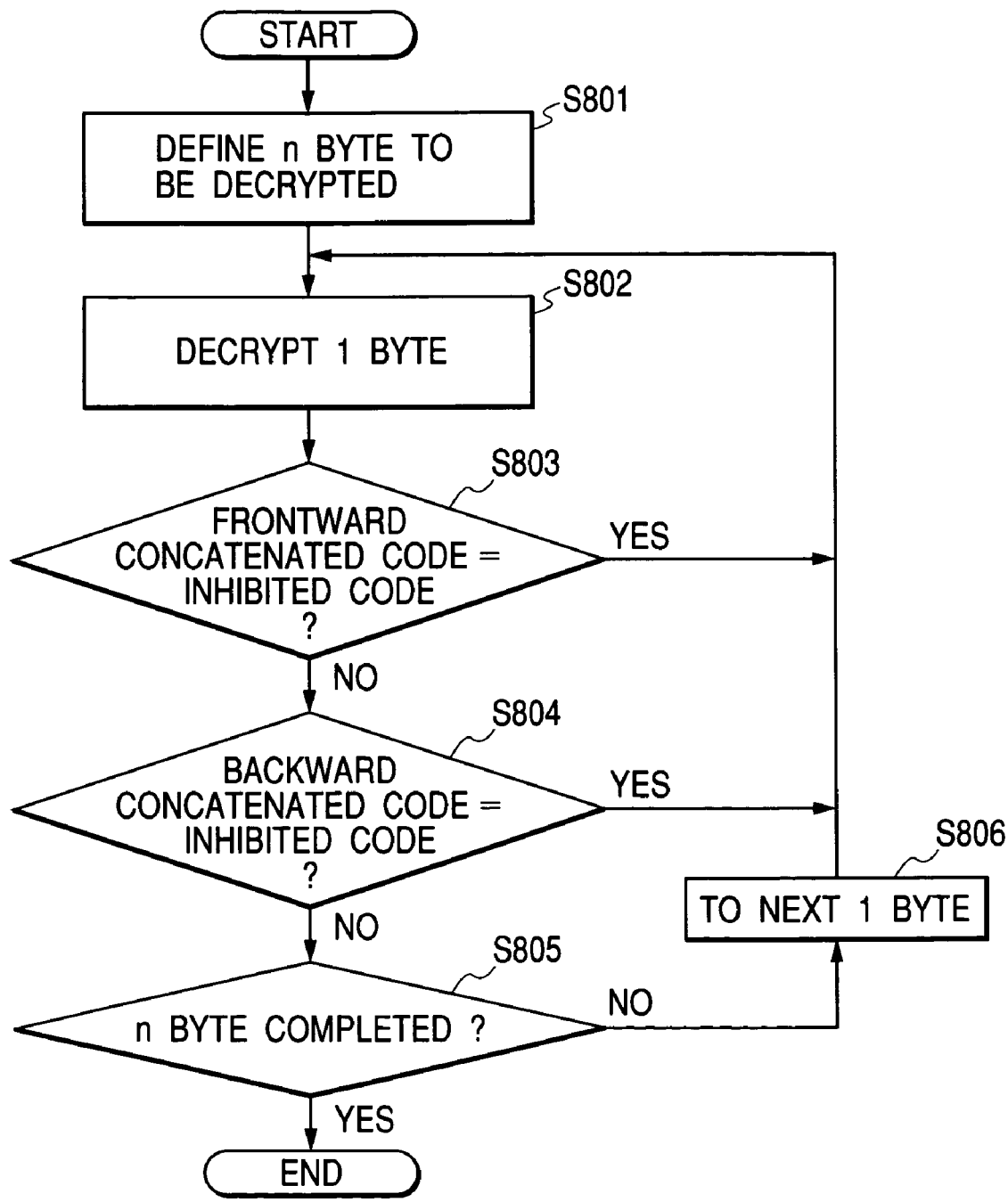
FIG. 8 is a flow chart showing a decryption process in the second embodiment.

FIG. 8 shows a flow chart of a decryption process. This flow can also be realized by executing a program loaded in the main memory apparatus 303 based on an input instruction from the computer shown in FIG. 3, particularly from the mouse 313 or the keyboard 314, for example by the MPU 302.

At first there are determined n bytes to be decrypted in the JPEG 2000 stream (step S801). Such portion to be decrypted is a portion encrypted by the encrypting process shown in FIG. 7, and such portion is assumed to be known prior to the decrypting process shown in FIG. 6. The JPEG 2000 stream to be decrypted may be stored in advance in the hard disk 304, or various memory media connected to the CD drive 309, the DVD drive 310, the FDD drive 311 etc. or may be obtained by executing a JPEG 2000 compression program loaded in the main memory apparatus 303 by the MPU 302 etc., or may be transmitted through a network not shown in FIG. 3.

Then 1 byte taken out is decrypted (step S802). Such decryption can be achieved by the aforementioned CFB or OFB mode of DES. Then there is discriminated whether a concatenated code, formed by such encryption result and an unencrypted byte positioned in front (frontward concatenated code), is a marker code of FF90h-FFFFh (inhibited code) (step S803).

In case of an inhibited code, the flow returns to the step S802 for executing the decryption process again on the decryption result. Then there is discriminated whether a concatenated code, formed by the encryption result and an unencrypted byte positioned behind (backward concatenated code), is an inhibited code (step S804). In case of an inhibited code, the flow returns to the step S702 for executing the decryption process again on the decryption result. Then there is discriminated whether such byte is a last n-th byte (step S805). The flow is terminated in case it is the n-th byte. If not, the flow proceeds to a next byte (step S806). Thereafter the process of the steps S802 to S806 is repeated, and the flow is terminated when n bytes are processed.

Third Embodiment

Figure 9:
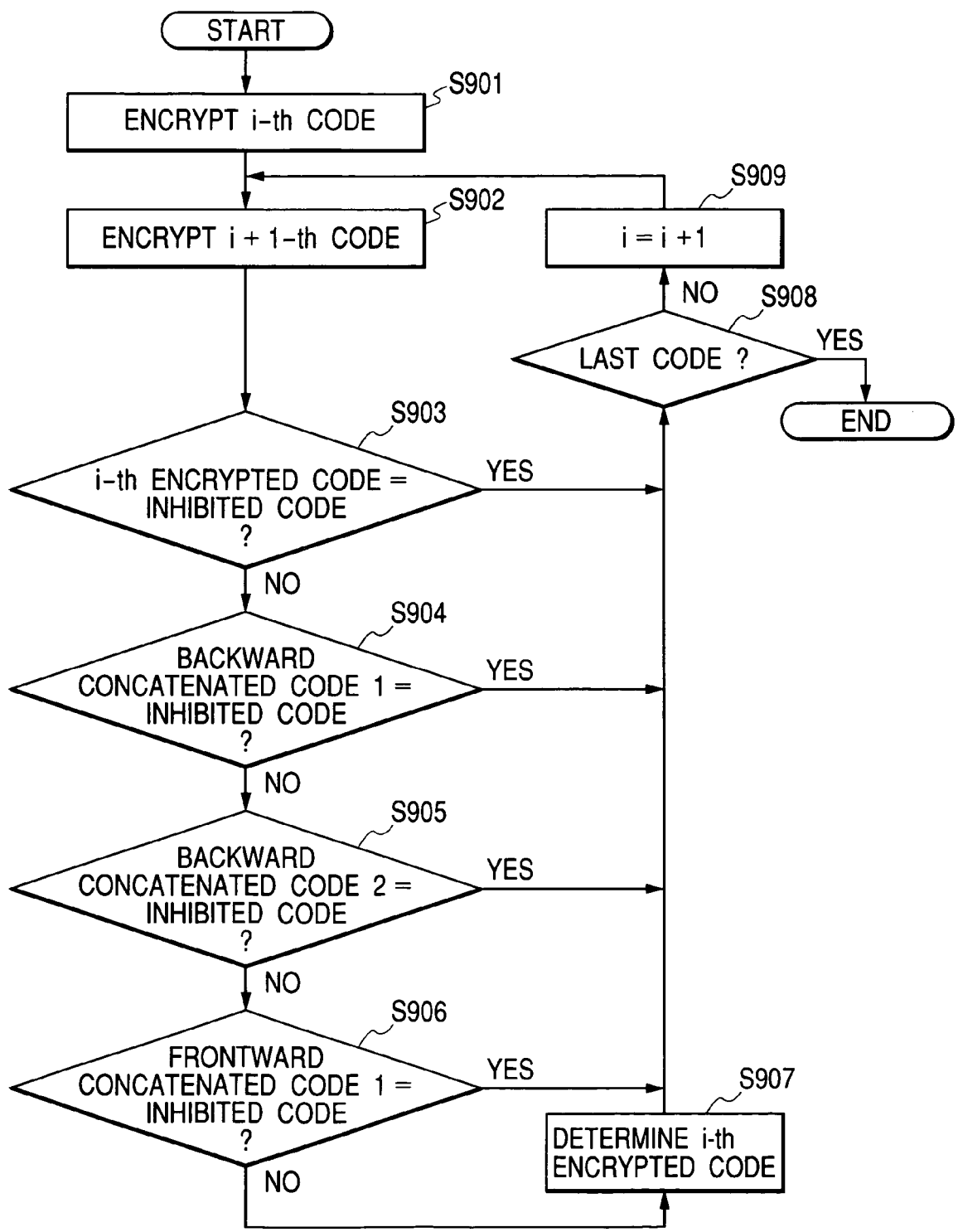
FIG. 9 is a flow chart showing an encryption process in a third embodiment.

FIG. 9 shows a flow chart of an encryption process or this embodiment. This flow can be realized by executing a program loaded in the main memory apparatus 303 based on an input instruction from the computer shown in FIG. 3, particularly from the mouse 313 or the keyboard 314, for example by the MPU 302.

At first an i-th code at the first data position to be encrypted in the JPEG 2000 stream is encrypted, to obtain an i-th encrypted code (step S901). As the object of encryption, there are assumed continuous n bytes in compressed data (data of the body shown in FIG. 4) not containing marker codes of FF90h-FFFFh, and a state i=1 is assumed. Also the code herein means 2-byte data which are a unit of the inhibited code of JPEG 2000.

The JPEG 2000 stream constituting the origin may be stored in advance in the hard disk 304, or various memory media connected to the CD drive 309, the DVD drive 310, the FDD drive 311 etc. or may be obtained by executing a JPEG 2000 compression program loaded in the main memory apparatus 303 by the MPU 302 etc., or may be transmitted through a network not shown in FIG. 3.

Then an (i+1)th code or second code is similarly encrypted (step S902). Then there is discriminated whether the i-th encrypted code is an inhibited code of FF90h-FFFFh (step S903).

In case the i-th encrypted code is not an inhibited code, one byte in the latter part of the i-th code is connected with one byte in the front part of the (i+1)th encrypted code to form a code (called backward concatenated code 1), and there is discriminated whether such code constitutes an inhibited code (step S904). In case it is not an inhibited code, one byte in the latter part of the i-th encrypted code is connected with one byte in the front part of the (i+1)th code to form a code (called backward concatenated code 2), and there is discriminated whether such code constitutes an inhibited code (step S905).

In case it is not an inhibited code, one byte in the latter part of the (i−1)th code is connected with one byte in the front part of the i-th encrypted code to form a code (called frontward concatenated code 1), and there is discriminated whether such code constitutes an inhibited code (step S906). The (i−1)th code means a code positioned in front of the i-th code to be encrypted in this state, and may be encrypted in a preceding process. However, the process of the step S906 may be dispensed with in case the i-th code is the first code, as the (i-1)th code does not exist.

In case the inhibited code does not exist in all of these, the i-th encrypted code is established as an encryption result of the i-th code (step S907). In case any of the steps S904-S906 provides an inhibited code, the encryption of the i-th code is not executed. Thus the encryption result of the i-th code is made same as the i-th code.

Then there is discriminated whether the i-th code is a last code of the object of encryption, and, if it is the last code, the flow is terminated (step S908). However, in case the i-th code is the last code, the processes of the steps S902, S904 and S906 can be dispensed with as the succeeding (i+1)th code does not exist. In case the i-th code is not the last code, a step S909 executes i=i+1 and the flow is repeated from the step S902.

The backward concatenated codes 1, 2 and the frontward concatenated code 1 are inspected in order to prevent presence of an inhibited code even in a frontward or backward concatenated state since the JPEG 2000 stream has a minimum unit of one byte.

Figure 10:
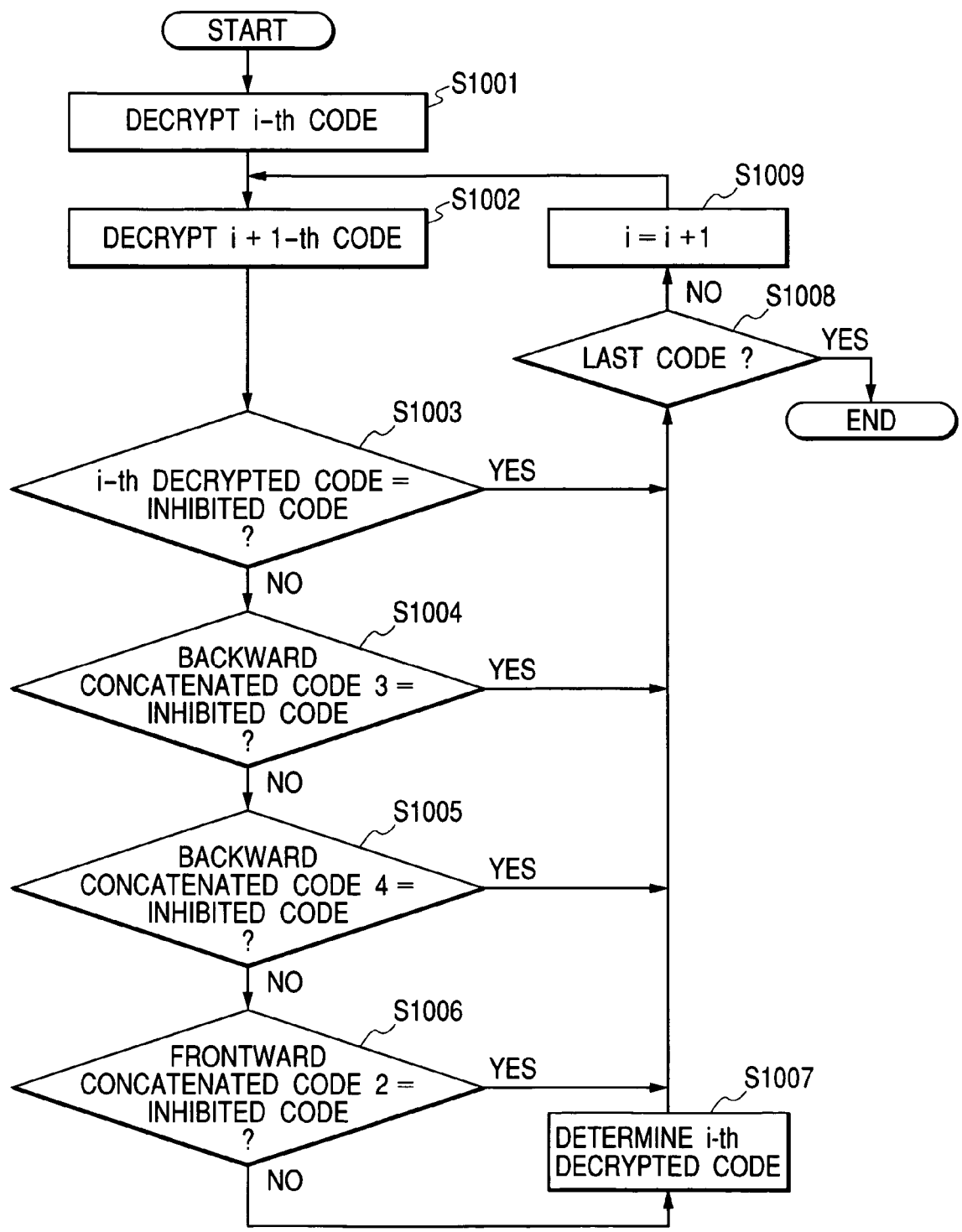
FIG. 10 is a flow chart showing a decryption process in the third embodiment.

FIG. 10 shows a flow chart of a decryption process or this embodiment. This flow can also be realized by executing a program loaded in the main memory apparatus 303 based on an input instruction from the computer shown in FIG. 3, particularly from the mouse 313 or the keyboard 314, for example by the MPU 302.

At first an i-th code at the first data position to be decrypted in the JPEG 2000 stream is decrypted, to obtain an i-th decrypted code (step S1001). The JPEG 2000 steam constituting the origin is a portion encrypted by the encrypting process shown in FIG. 9, and is handled as encrypted data, including a portion not encrypted by the process shown in FIG. 9 (The portion not encrypted in the process shown in FIG. 9 is not decrypted as will be understood from the following description).

The JPEG 2000 stream constituting the origin may be stored in advance in the hard disk 304, or various memory media connected to the CD drive 309, the DVD drive 310, the FDD drive 311 etc. or may be obtained by executing a JPEG 2000 compression program loaded in the main memory apparatus 303 by the MPU 302 etc., or may be transmitted through a network not shown in FIG. 3. Also the decrypting process can be executed for example by the aforementioned CFB or OFB mode of DES.

Then an (i+1)th code or second code is similarly decrypted (step S1002). Then there is discriminated whether the i-th decrypted code is an inhibited code of FF90h-FFFFh (step S1003).

In case the i-th decrypted code is not an inhibited code, one byte in the latter part of the i-th decrypted code is connected with one byte in the front part of the (i+1)th encrypted code to form a code (called backward concatenated code 4), and there is discriminated whether such code constitutes an inhibited code (step S1004). In case it is not an inhibited code, one byte in the latter part of the i-th encrypted code is connected with one byte in the front part of the (i+1)th decrypted code to form a code (called backward concatenated code 5), and there is discriminated whether such code constitutes an inhibited code (step S1005).

In case it is not an inhibited code, one byte in the latter part of the (i−1)th code is connected with one byte in the front part of the i-th decrypted code to form a code (called frontward concatenated code 2), and there is discriminated whether such code constitutes an inhibited code (step S1006). The (i−1)th code means a code positioned in front of the i-th code to be decrypted in this state, and may be or may not be decrypted in a preceding process. However, the process of the step S1006 may be dispensed with in case the i-th code is the first code, as the (i-1)th code does not exist.

In case the inhibited code does not exist in all of these, the i-th decrypted code is established as a decryption result of the i-th encrypted code (step S1007). In case any of the steps S1004-S1006 provides an inhibited code, the decryption of the i-th encrypted code is not executed. Thus the decryption result of the i-th encrypted code is made same as the i-th encrypted code.

Then there is discriminated whether the i-th encrypted code is a last code of the object of decryption, and, if it is the last code, the flow is terminated (step S1008). However, in case the i-th encrypted code is the last code, the processes of the steps S1002, S1004 and S1006 can be dispensed with as the succeeding (i+1)th encrypted code does not exist. In case the i-th encrypted code is not the last code, a step S1009 executes i=i+1 and the flow is repeated from the step S1002.

In the OFB or CFB mode of DES, encryption and decryption can be executed by calculating EXOR on the input data with same random number data. Thus the encryption and the decryption become a same process. Therefore, the code encrypted in the process of FIG. 9 is encrypted again in the process of FIG. 10 to return to the original code. Therefore, the discriminations in the steps S903 to S906 are same as those in the steps S1003 to S1006, and the code not encrypted in the process of FIG. 9 is not decrypted in the process of FIG. 10. Thus the codes decrypted in the process of FIG. 10 are only those encrypted in the process of FIG. 9, so that the code subjected to the process of FIG. 9 can be returned to the original code by the process of FIG. 10.

Fourth Embodiment

In the process shown in FIG. 9, there is assumed a case where the object of encryption is continuous, but, in the following, there will be explained a case where the object of encryption is not continuous.

Figure 11:
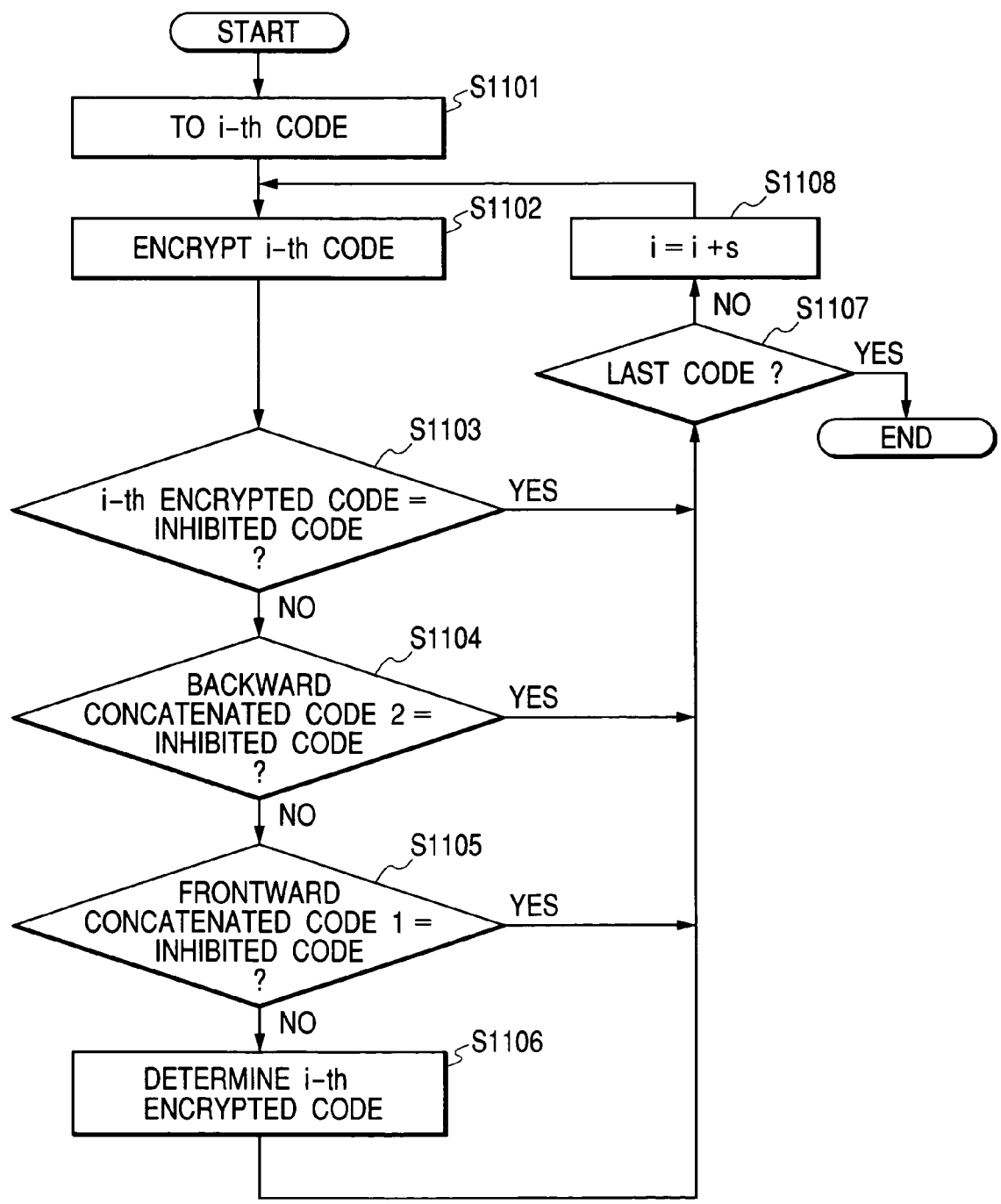
FIG. 11 is a flow chart showing an encryption process in a fourth embodiment.

FIG. 11 shows a flow chart of an encryption process in the present embodiment. This flow can be realized by executing a program loaded in the main memory apparatus 303 based on an input instruction from the computer shown in FIG. 3, particularly from the mouse 313 or the keyboard 314, for example by the MPU 302.

At first the flow goes to an i-th code which is in data position to be encrypted in the JPEG 2000 stream (step S1101).

The i-th code is encrypted to obtain an i-th encrypted code (step S1102). There is considered a case where the object of encryption is compressed data (data of the body shown in FIG. 4) not containing marker codes of FF90h-FFFFh (hereinafter called inhibited code), and the encryption is executed at an interval of s codes (s>1).

Also the code herein means 2-byte data which are a unit of the inhibited code of JPEG 2000. The JPEG 2000 stream constituting the origin may be stored in advance in the hard disk 304, or various memory media connected to the CD drive 309, the DVD drive 310, the FDD drive 311 etc. or may be obtained by executing a JPEG 2000 compression program loaded in the main memory apparatus 303 by the MPU 302 etc., or may be transmitted through a network not shown in FIG. 3. Also the encryption process can be executed by the aforementioned CFB or OFB mode of DES.

Then there is discriminated whether the i-th encrypted code is an inhibited code of FF90h-FFFFh (step S1103). In case the i-th encrypted code is not an inhibited code, one byte in the latter part of the i-th code is connected with one byte in the front part of the (i+1)th data to form a code (called backward concatenated code 2), and there is discriminated whether such code constitutes an inhibited code (step S1104).

In case it is not an inhibited code, one byte in the latter part of the (i−1)th code is connected with one byte in the front part of the i-th encrypted code to form a code (called frontward concatenated code 1), and there is discriminated whether such code constitutes an inhibited code (step S1105). The (i−1)th code means a code positioned in front of the i-th code to be encrypted in this state, and may be encrypted in a preceding process. However, the process of the step S1105 may be dispensed with in case the i-th code is the first code, as the (i−1)th code does not exist.

In case the inhibited code does not exist in all of these, the i-th encrypted code is established as an encryption result of the i-th code (step S1106). In case any of the steps S1103-S1105 provides an inhibited code, the encryption of the i-th code is not executed. Thus the encryption result of the i-th code is made same as the i-th code.

Then there is discriminated whether the i-th code is a last code of the object of encryption, and, if it is the last code, the flow is terminated (step S1107). If not, a step S1108 executes i=i+s and the flow is repeated from the step S1102.

In this case, the inspection is made on the backward concatenated code 2 and the frontward concatenated code 1 only in contrast to the process of FIG. 9, because s is equal to or larger than 2 to execute the encryption in discrete manner so that the codes in front of and behind the i-th code are not encrypted.

Figure 12:
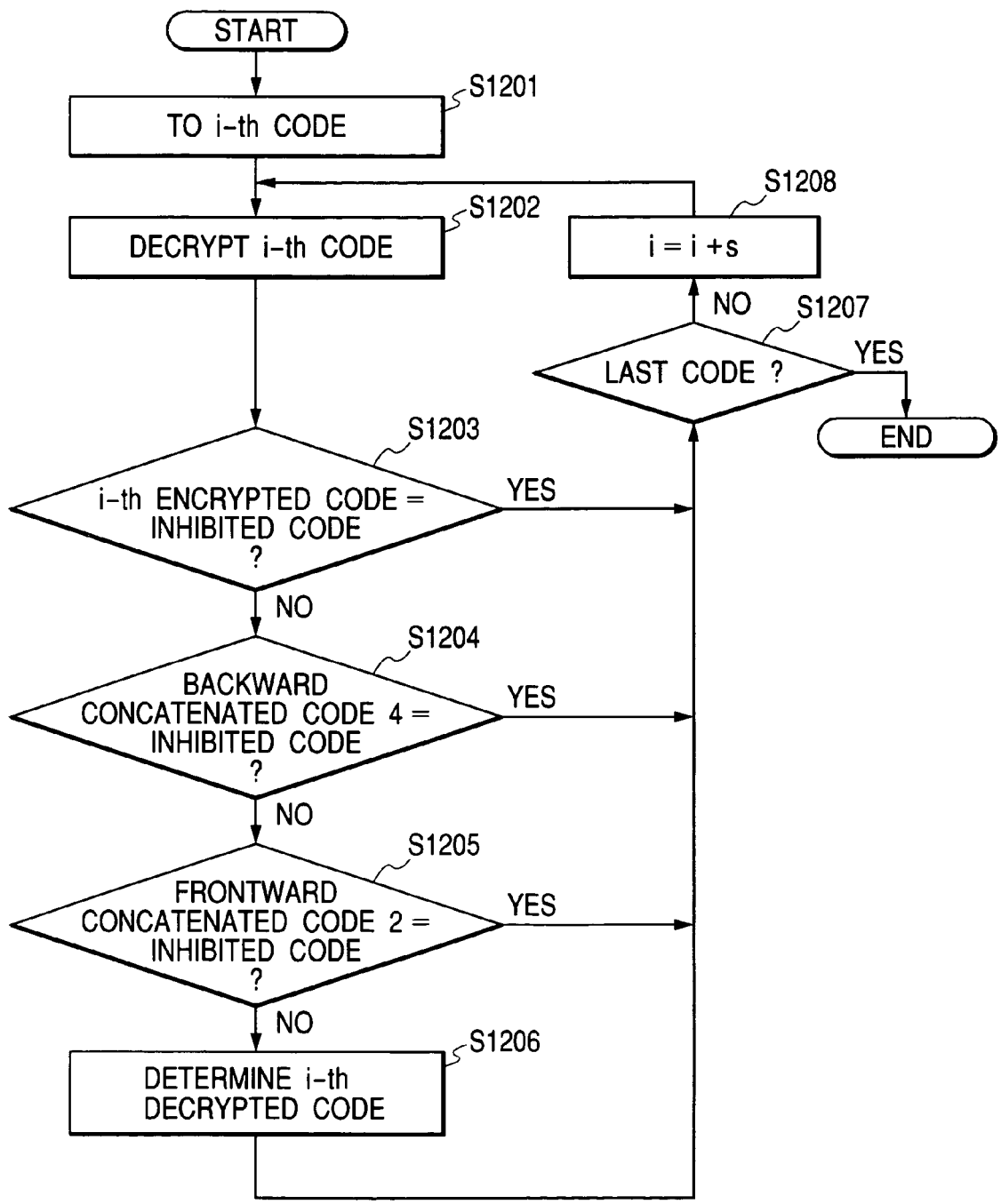
FIG. 12 is a flow chart showing a decryption process in the fourth embodiment.

Then FIG. 12 shows a flow chart of a decryption process corresponding to the encryption process shown in FIG. 11. This flow can be realized by executing a program loaded in the main memory apparatus 303 based on an input instruction from the computer shown in FIG. 3, particularly from the mouse 313 or the keyboard 314, for example by the MPU 302.

At first the flow goes to an i-th encrypted code which is in data position to be decrypted in the JPEG 2000 stream (step S1201). Then the i-th encrypted code is decrypted to obtain an i-th decrypted code (step S1202). The JPEG 2000 steam constituting the origin is data encrypted by the process shown in FIG. 11, and is handled as encrypted data, including a portion not encrypted by the process shown in FIG. 11 (The portion not encrypted in the process shown in FIG. 11 is not decrypted as will be understood from the following description).

The JPEG 2000 stream constituting the origin may be stored in advance in the hard disk 304, or various memory media connected to the CD drive 309, the DVD drive 310, the FDD drive 311 etc. or may be obtained by executing a JPEG 2000 compression program loaded in the main memory apparatus 303 by the MPU 302 etc., or may be transmitted through a network not shown in FIG. 3. Also the decryption process can be executed by the aforementioned CFB or OFB mode of DES.

Then there is discriminated whether the i-th decrypted code is an inhibited code of FF90h-FFFFh (step S1203). In case the i-th decrypted code is not an inhibited code, one byte in the latter part of the i-th decrypted code is connected with one byte in the front part of the (i+1)th data to form a code (called backward concatenated code 4), and there is discriminated whether such code constitutes an inhibited code (step S1204).

In case it is not an inhibited code, one byte in the latter part of the (i−1)th data is connected with one byte in the front part of the i-th dedcrypted code to form a code (called frontward concatenated code 2), and there is discriminated whether such code constitutes an inhibited code (step S1205). The (i−1)th code means a code positioned in front of the i-th code to be decrypted in this state, and may be or may not be decrypted in a preceding process. However, the process of the step S1205 may be dispensed with in case the i-th code is the first code, as the (i−1)th code does not exist.

In case the inhibited code does not exist in all of these, the i-th decrypted code is established as a decryption result of the i-th encrypted code (step S1206). In case any of the steps S1203-S1205 provides an inhibited code, the decryption of the i-th encrypted code is not executed. Thus the decryption result of the i-th encrypted code is made same as the i-th encrypted code.

Then there is discriminated whether the i-th encrypted code is a last code of the object of decryption, and, if it is the last code, the flow is terminated (step S1207). If not, a step S1208 executes i=i+s and the flow is repeated from the step S1202.

In the OFB or CFB mode of DES, encryption and decryption can be executed by calculating EXOR on the input data with same random number data. Thus the encryption and the decryption become a same process. Therefore, the code encrypted in the process of FIG. 11 is encrypted again in the process of FIG. 12 to return to the original code. Therefore, the discriminations in the steps S1103 to S1106 are same as those in the steps S1203 to S1206, and the code not encrypted in the process of FIG. 11 is not decrypted in the process of FIG. 12. Thus the codes decrypted in the process of FIG. 12 are only those encrypted in the process of FIG. 11, so that the code subjected to the process of FIG. 11 can be returned to the original code by the process of FIG. 12.

<Variation>

The foregoing embodiments have been explained by DES, but the present invention is not limited to DES and is naturally applicable to a common key cipher such as AES, MISTY or Camellia. In such case, the strength of the encryption and decryption of the present invention has a safety corresponding to the employed cipher process.

Also the encryption mode is not limited to CFB or OFB, but there may be employed any method capable of encrypting data of an arbitrary length.

Also in the foregoing embodiments, the inhibited code is a marker code of FF90h-FFFFh, but the inhibited code can also be a code containing such marker code or a code containing a part thereof such as FF.

Also the foregoing embodiments have been explained in the JPEG 2000 standard with the inhibited code as a marker code of FF90h-FFFFh, but a similar principle is naturally applicable, in other encoding standards, to inhibited code defined in such standards.

Also in the foregoing embodiments, 1 byte or 2 bytes have been explained as a unit, the present invention is applicable also to a case where the unit is equal to or larger than 2 bytes. However, in case the inhibited code is 2 bytes while the unit of encryption and decryption is 2 bytes or longer, it is necessary to inspect whether the inhibited code is included in the result of encryption or decryption.

Fifth Embodiment

In the present embodiment, the encryption is executed by each byte, and is executed by executing an XOR calculation on the encryption object data and a pseudo random number.

Figure 13:
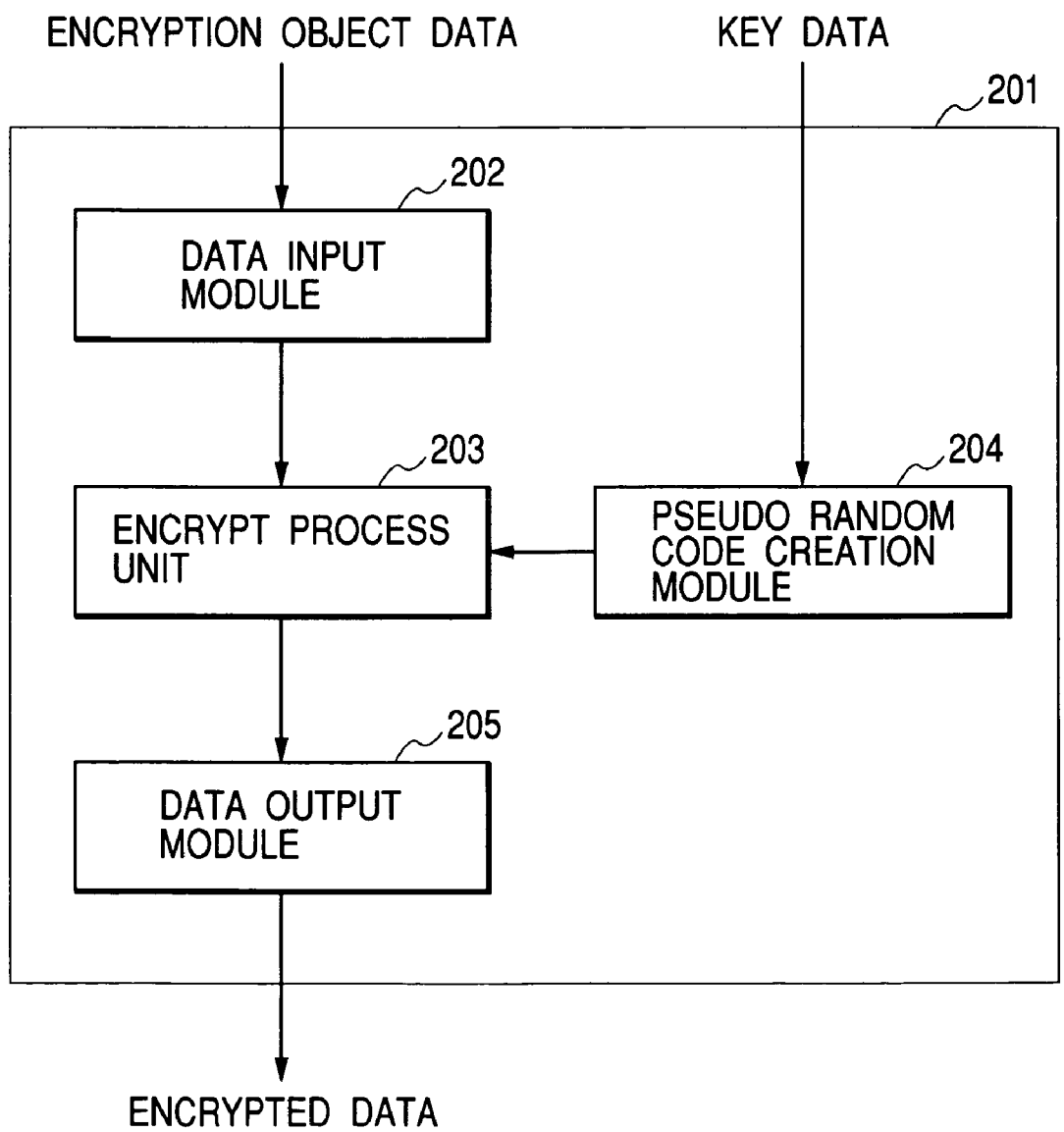
FIG. 13 is a flow chart showing an encryption apparatus in a fifth embodiment.

FIG. 13 shows an information processing apparatus for executing an encryption process. Encryption object data and key data are entered into an information processing apparatus 201. The encryption object data are entered into a data input module 202, while the key data are entered into a pseudo random number creation module 204. The pseudo random number creation module 204 generates a pseudo random number based on the entered key data, and enters it into an encryption process unit 203. The encryption process unit 203 encrypts the simultaneously entered encryption object data by the pseudo random number, and the encrypted data are outputted from the information processing apparatus 201 through a data output module 205. In case of employing an exclusive logic sum (XOR) calculation as the encryption process and subjecting the encryption object data to the XOR calculation with the pseudo random number, the apparatus for the encryption process can be same as the apparatus for the decryption process. In the following description, it is assumed that the apparatus for encryption process shown in FIG. 13 is same as the apparatus for decryption process.

Figure 14:
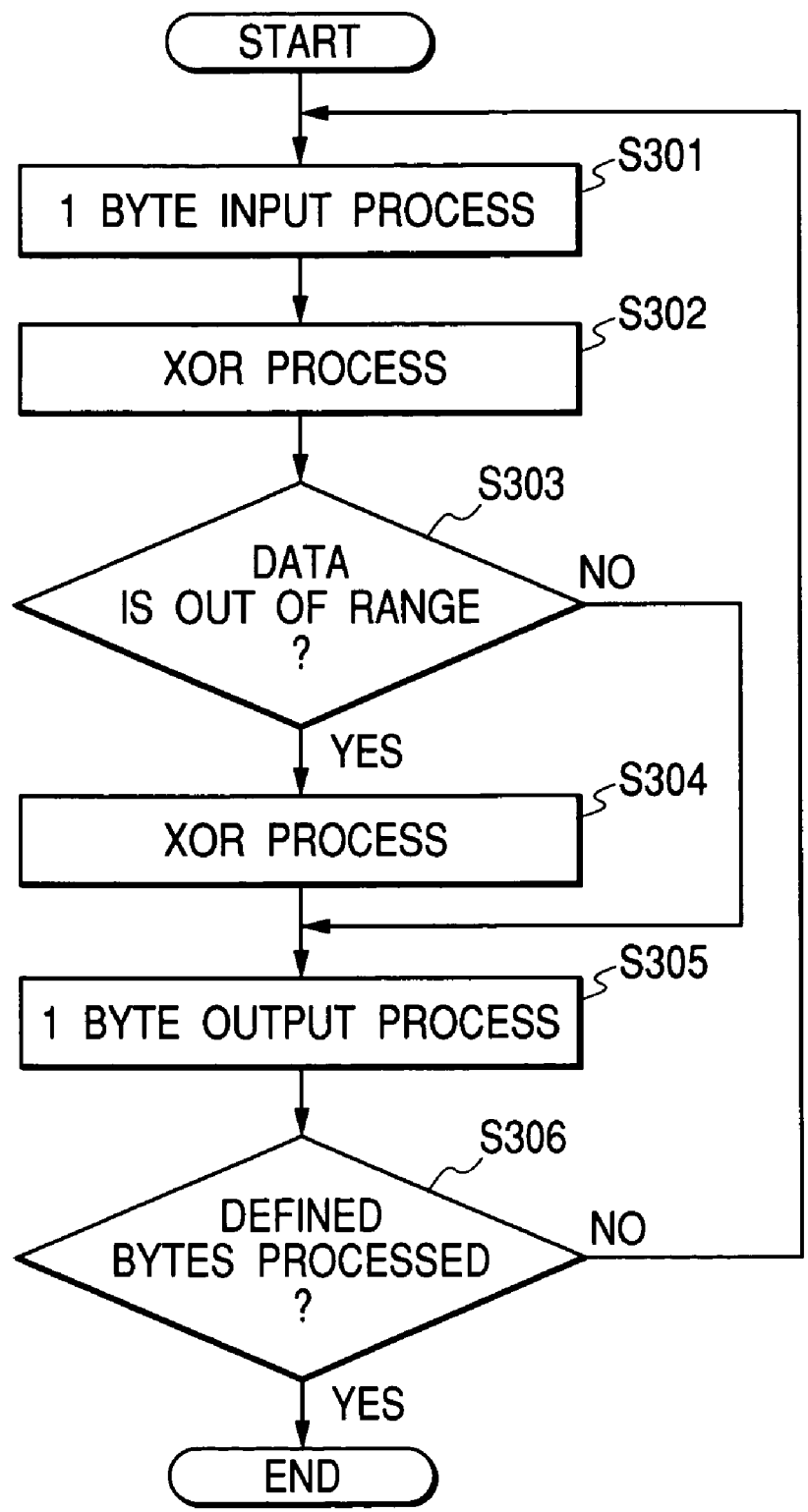
FIG. 14 is a flow chart showing an encryption process in the fifth embodiment.

FIG. 14 shows a flow chart of an encryption process for processing by every byte. A step S301 cuts out 1 byte in succession from the encryption object data and the flow proceeds to a step S302. A step S302 executes an XOR process by an encryption process unit 203. A step S303 discriminates whether the data are out of a range in the unit of a byte, and the flow proceeds to a step S304 or S305 respectively in case the data are out of the range or within the range. A step S304 executes a similar process with the pseudo random number employed in the step S302. A step S305 outputs the encrypted data to an HDD 304 or the like, and the flow proceeds to a step S306. A step S306 discriminates whether information of all the encryption object data has been processed, and, if not, the flow proceeds to the step S301. The flow is terminated in case the step S306 identifies that the process has been completed.

This process has an advantage that the encryption object data can be stored in a same area in the steps S301, S302 and S304. In case of securing an area A for storing the input data, the input data are copied in such area A in the step S301. In the step S302, data after the exclusive logic sum process can be added to the area A. Also in the step S304, data after the exclusive logic sum process can be added to the area A. Also in a C language program, following description is possible to reduce the memory amount:

```
char input_data[MAX_SIZE]; /*step301*/
for (i=0; I<MAX_SIZE; i++) {
    input_data[i] ^= steam_data[i];/*step302*/
    if(IsStrictData(input_data[i] ^=
    stream_data[i];/*step304*/}
```

Figure 15:
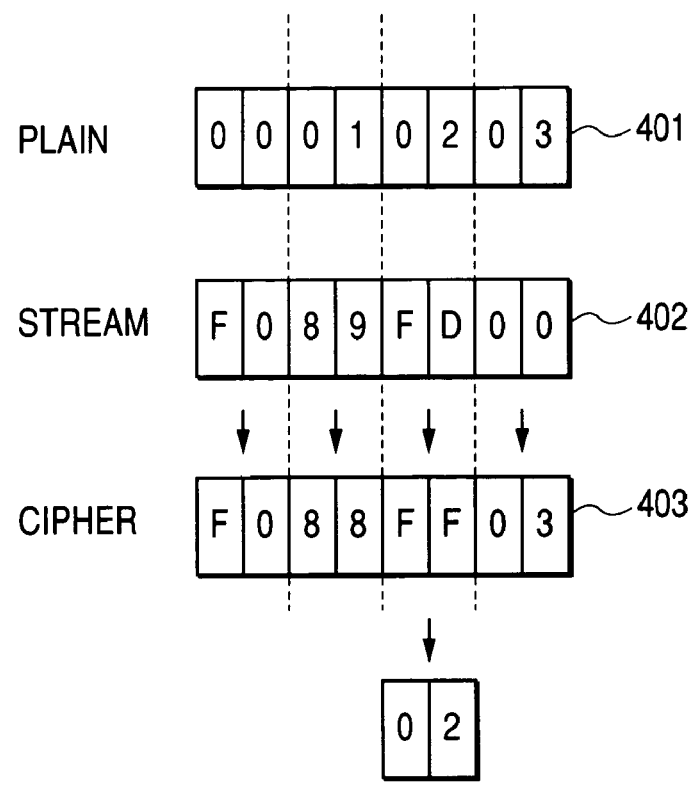
FIG. 15 is a conceptual view showing an encryption example in the fifth embodiment.

FIG. 15 shows an example in which a value range is assumed from 00 to FE (hexadecimal), and a value out of range is FF only. There are shown encryption object data 401 and pseudo random number data 402 to be used in the step S302. An exclusive logic sum calculation is executed for every byte, to obtain encrypted data as indicated by 403. A first byte is processed as follows. Since the encryption object data are 00 while the pseudo random number is F0, the data after the exclusive logic sum calculation are F0, which are within the range and are therefore taken as the encrypted data. A second byte is processed similarly to obtain 88. A third byte provides, after the exclusive logic sum calculation, data FF which are detected as out of range by the step S303, so that the step S304 executes an exclusive logic sum calculation on FF and FD to obtain encrypted data of 02. As a result, the encryption object data "00010203" provide encrypted data "F0880203".

Figure 16:
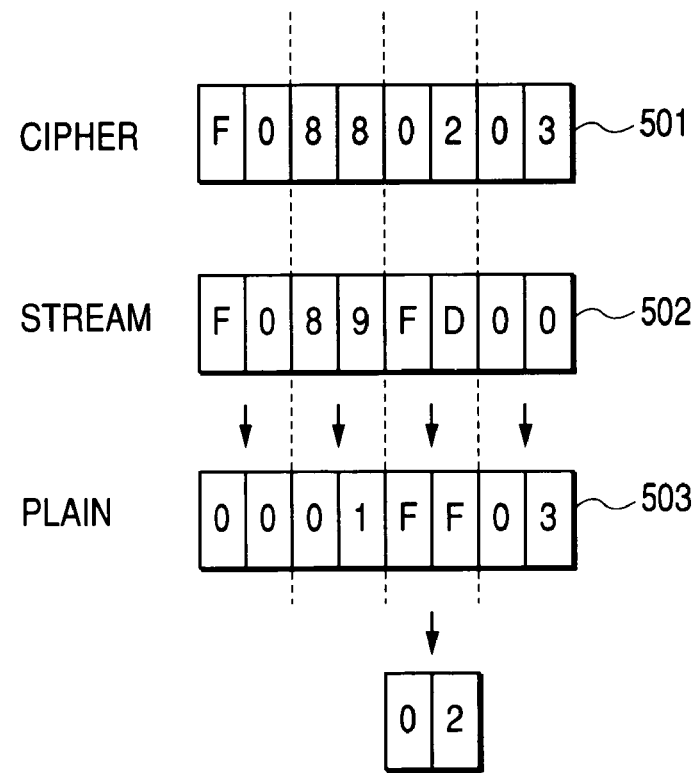
FIG. 16 is a conceptual view showing a decryption process in the fifth embodiment.

FIG. 16 shows a decryption process for the encryption process shown in FIG. 15. There are shown encrypted data 501 and pseudo random number data 502 to be used in the step S302. A first byte is processed as follows. Since the encrypted data are F0 while the pseudo random number is F0, the data after the exclusive logic sum calculation are F0, which is within the range and are therefore taken as the decrypted data. A second byte is processed similarly to obtain 01. A third byte provides, after the exclusive logic sum calculation, data FF which are detected as out of range by the step S303, so that the step S304 executes an exclusive logic sum calculation on FF and FD to obtain decrypted data of 02. As a result, the encrypted data "F0880203" provides decrypted data "00010203".

Figure 22:
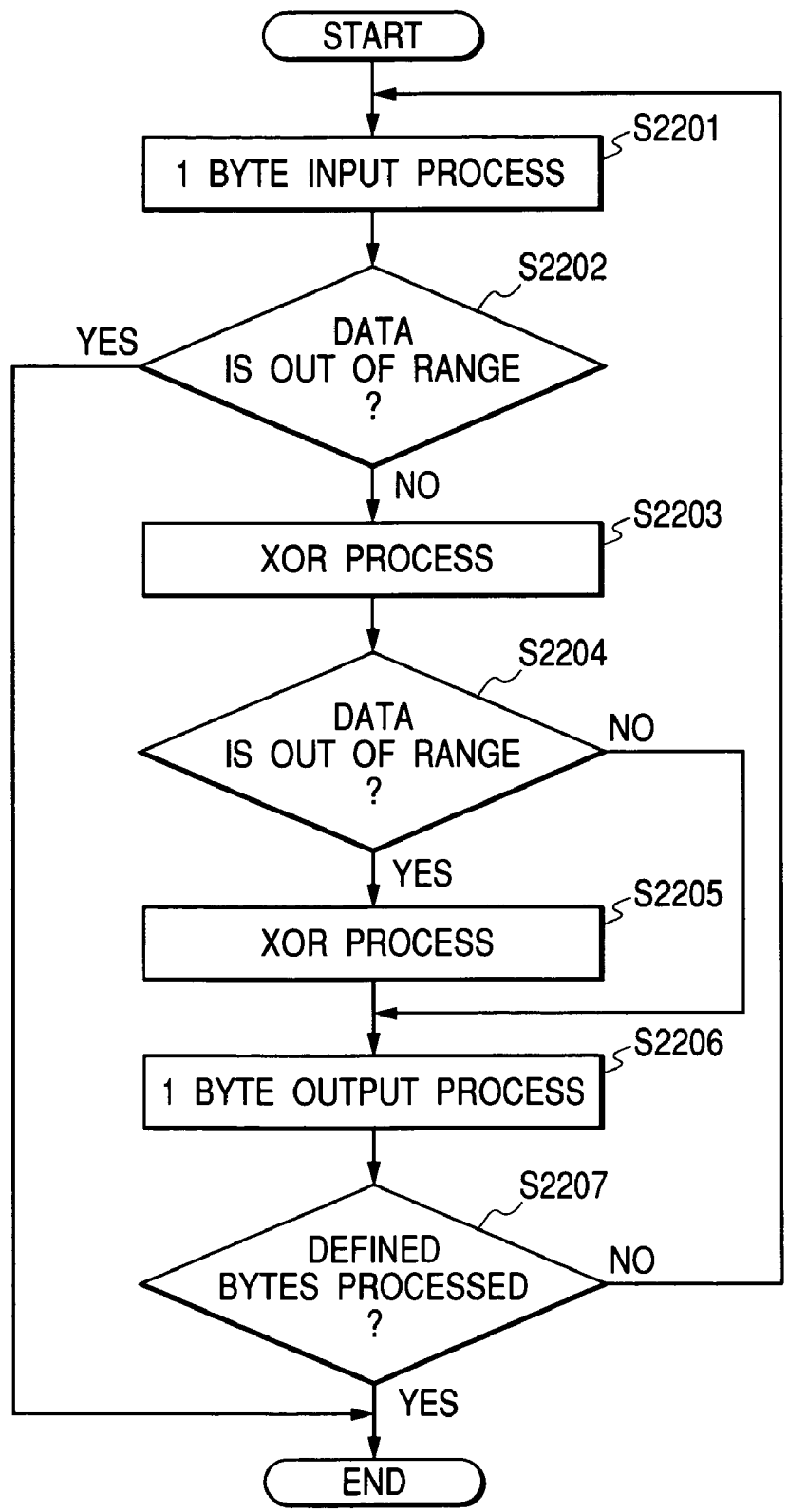
FIG. 22 is a flow chart showing an encryption process in the fifth embodiment.

Also there will be explained, with reference to FIG. 22, a case having a function of checking whether the encryption object data are out of the range. A step S2202 discriminates whether data entered in a step S2201 are data out of range. In case of the data out of range, the subsequent process is suspended and the flow is terminated. In case of absence of such function, the flow chart shown in FIG. 14 cannot achieve a proper process in case improper data which are output of the range are inputted. In case the input data are improper data, it is also possible to suspend the encryption and to inform such effect. The sequence after a step S2203 is similar to that after the step S302 in FIG. 14 and will not therefore be explained.

Sixth Embodiment

Figure 17:
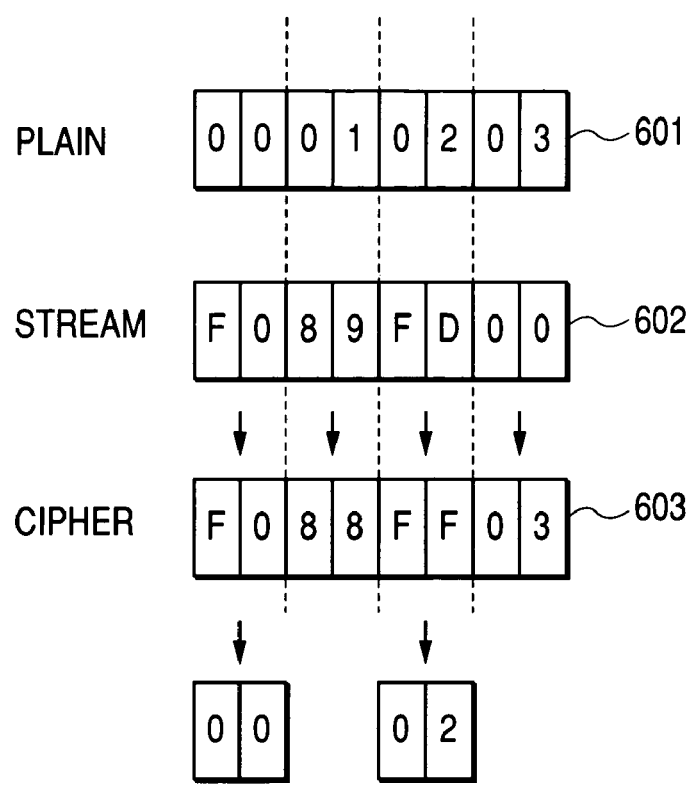
FIG. 17 is a conceptual view showing an encryption example in a sixth embodiment.

While the fifth embodiment has shown a case with one data out of the range, the present embodiment shows that a similar process is possible also in case such data are present in plurality. FIG. 17 shows an example in which data out of range are F0 to FF. A first byte is processed as follows. Since the encryption object data are 00 while the pseudo random number is F0, the data after the exclusive logic sum calculation are F0, which are detected as out of range by the step S303, so that the step S304 executes an exclusive logic sum calculation on F0 and F0 to obtain encrypted data of 00. As a result of a similar process, the encryption object data "00010203" provide encrypted data "00880203".

In case there are many data out of range as in the example of PNG, the encrypted data may show limited scrambled portions in comparison with the data prior to encryption. Therefore, there will be explained a process having a 1-to-1 conversion table from data within the range to data out of the range as shown in FIG. 22 and executing encryption and decryption utilizing such table.

Figure 19:
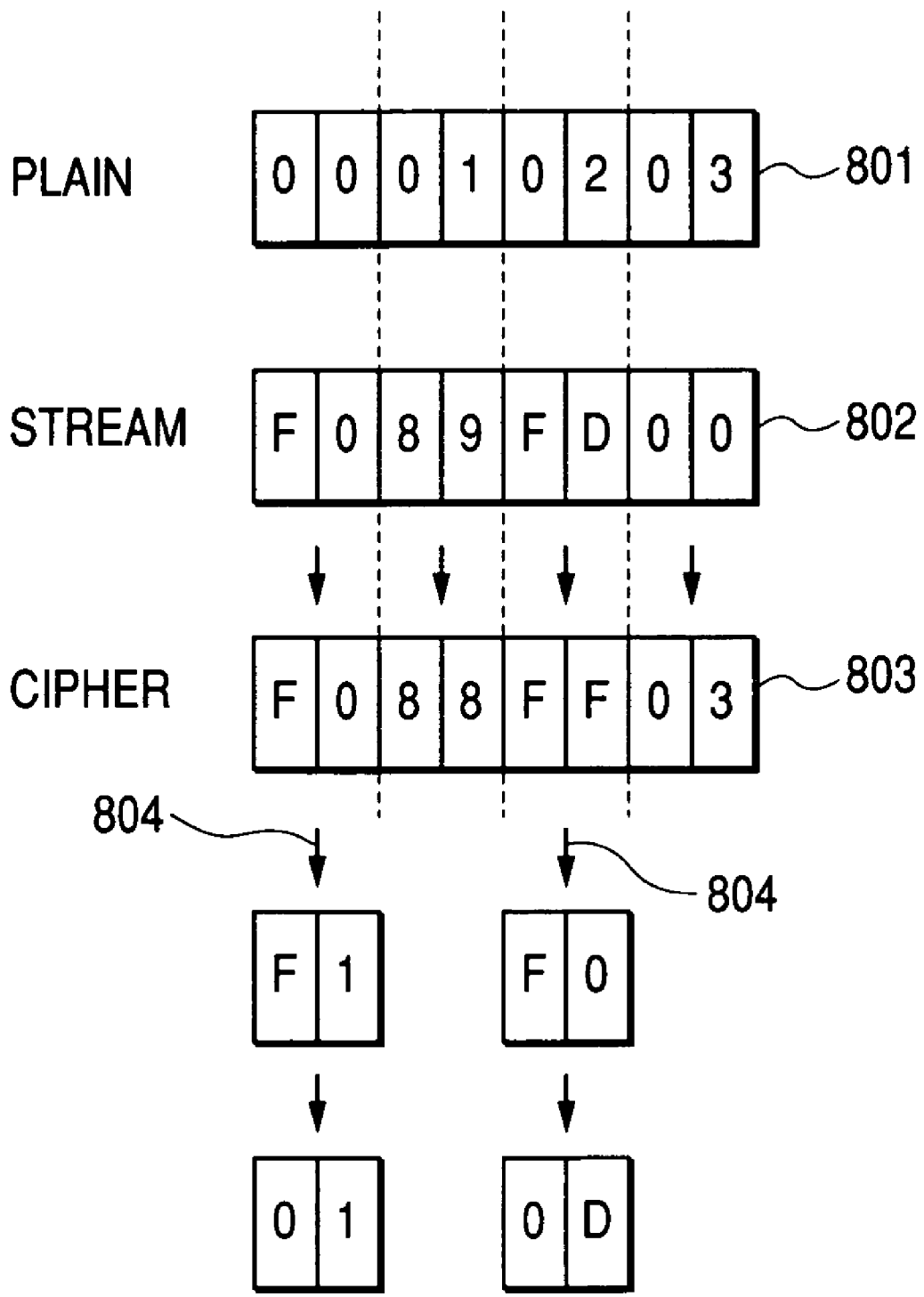
FIG. 19 is a conceptual view showing an encryption example in the sixth embodiment.

FIG. 19 shows an example of the process. There are shown encryption object data 801, pseudo random number data 802 to be employed in the step S302 and encrypted data 803. The process is same as that shown in FIG. 17, but a following process is added. In the obtained encrypted data, a conversion table shown in FIG. 21 to execute a conversion 804. A first byte, F0, is converted into F1 according to FIG. 21. Thus obtained F1 is subjected to an XOR process in the step S304 to obtain encrypted data 01. As a result of a similar process, the encryption object data "00010203" provide encrypted data "01880B03".

Figure 18:
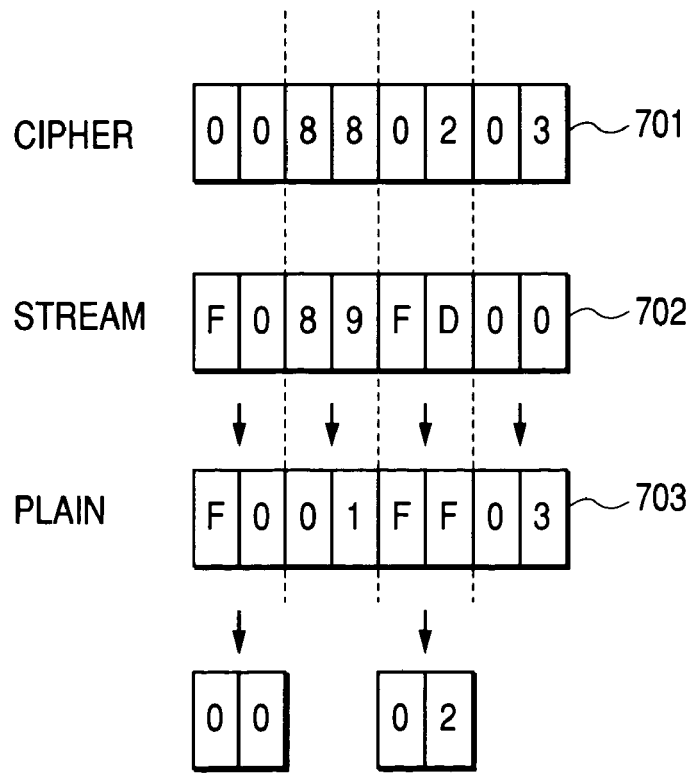
FIG. 18 is a conceptual view showing a decryption process in the sixth embodiment.
Figure 20:
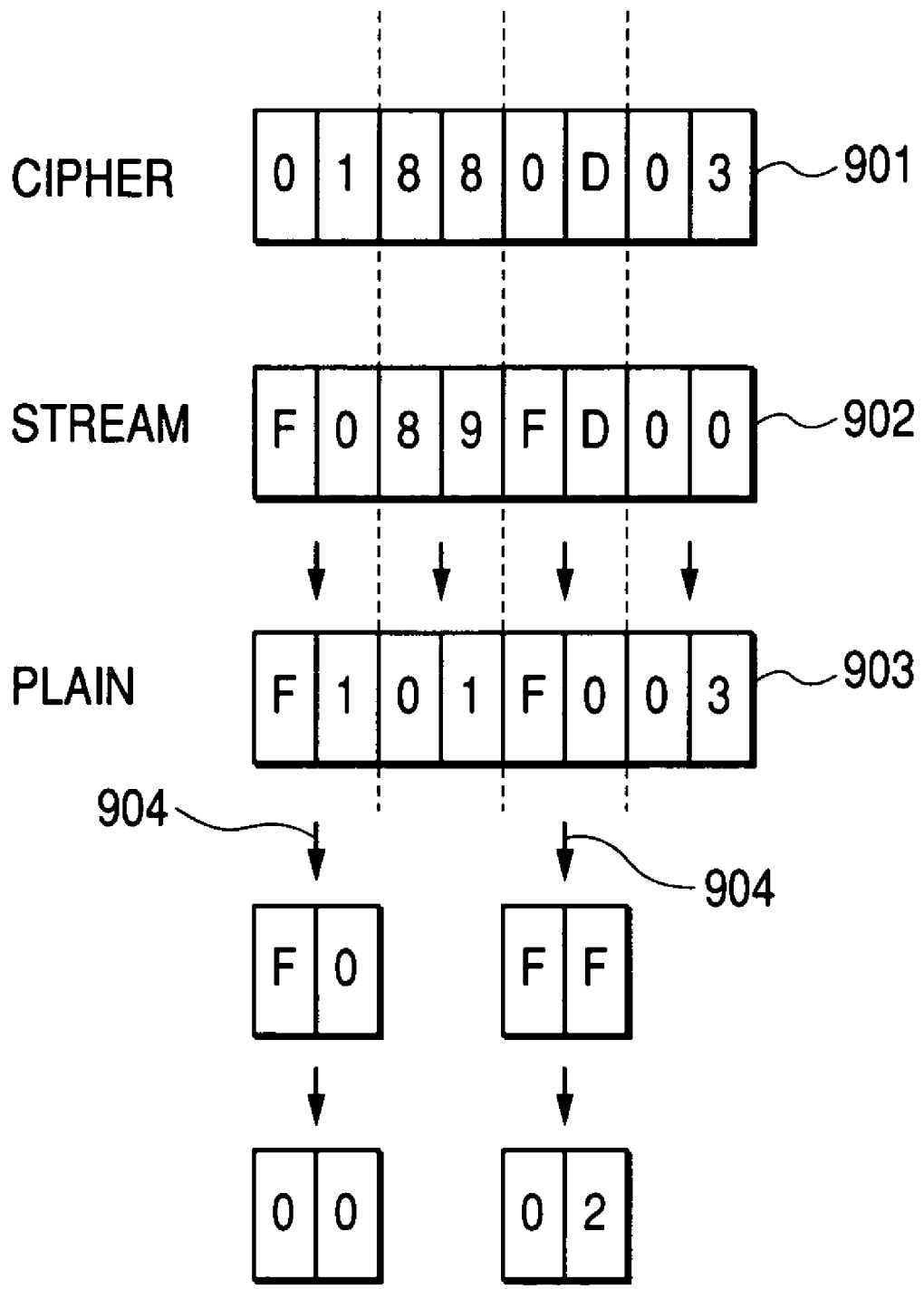
FIG. 20 is a conceptual view showing a decryption process in the sixth embodiment.
Figure 21:
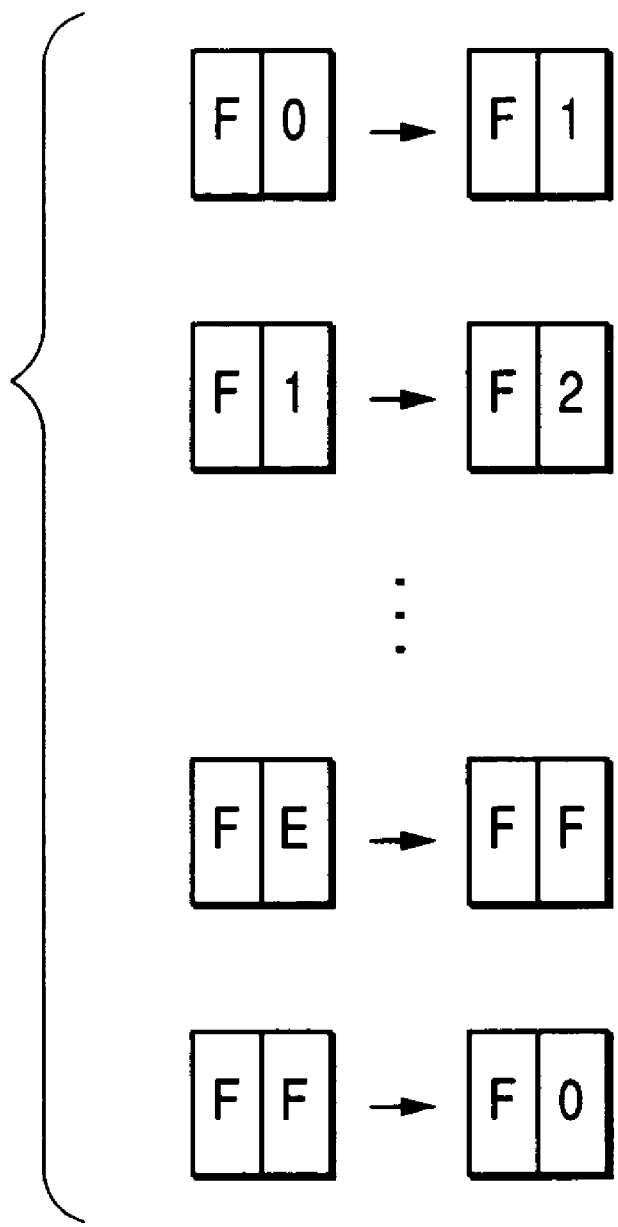
FIG. 21 is a conceptual view showing a conversion table in the sixth embodiment.

In a decryption process shown in FIG. 20, an inverse converting operation 904 is added, utilizing the conversion table shown in FIG. 21. In the first byte, F1 is obtained in the same manner as in FIG. 18, then it is subjected to an inverse conversion (904) with the table shown in FIG. 21 to obtain F0, which is finally subjected to the XOR process in the step S304 to obtain 00. As a result of a similar process, the encrypted data "01880B03" provide decrypted data "00010203".

The conversion table shown in FIG. 21 may be fixed, or may be varied according to the number of bytes of the object data or according to the result of a preceding encryption process as in the CBC mode in the block cipher system.

Seventh Embodiment

The present embodiment explained a method of executing a process corresponding to a limited value range in JPEG 2000 (data out of range being FF90 to FFFF).

Since the data out of range are from FF90 to FFFF for arbitrary 2-byte data, there can be easily conceived a method of executing encryption for every 2 bytes as in the fifth and sixth embodiments. In the present embodiment, therefore, there will be explained a method of processing every 1 byte.

The aforementioned "data out of range being FF90 to FFFF" can be met in case following rules are satisfied. All the values are 1 byte data, in hexadecimal presentation:

rule 1:
A) 00 to 8F are converted only to 00 to 8F;
B) 90 to FE are converted only to 90 to FE; and
C) FF is converted only to FF.

Figure 23:
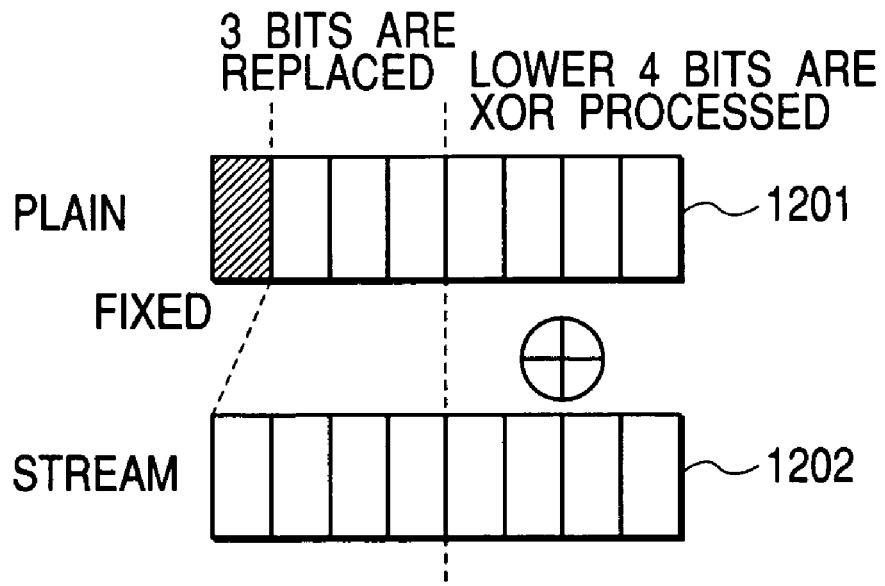
FIG. 23 is a conceptual view showing a conversion method in a seventh embodiment.

FIG. 23 represents a conversion method satisfying the rule 1, wherein 1201 represents bits of 1-byte (8-bit) data processed by the step S301 among the encryption object data. Also 1202 represents bits of 1-byte pseudo random number data subjected to an XOR data in the step S302.

Figure 25:
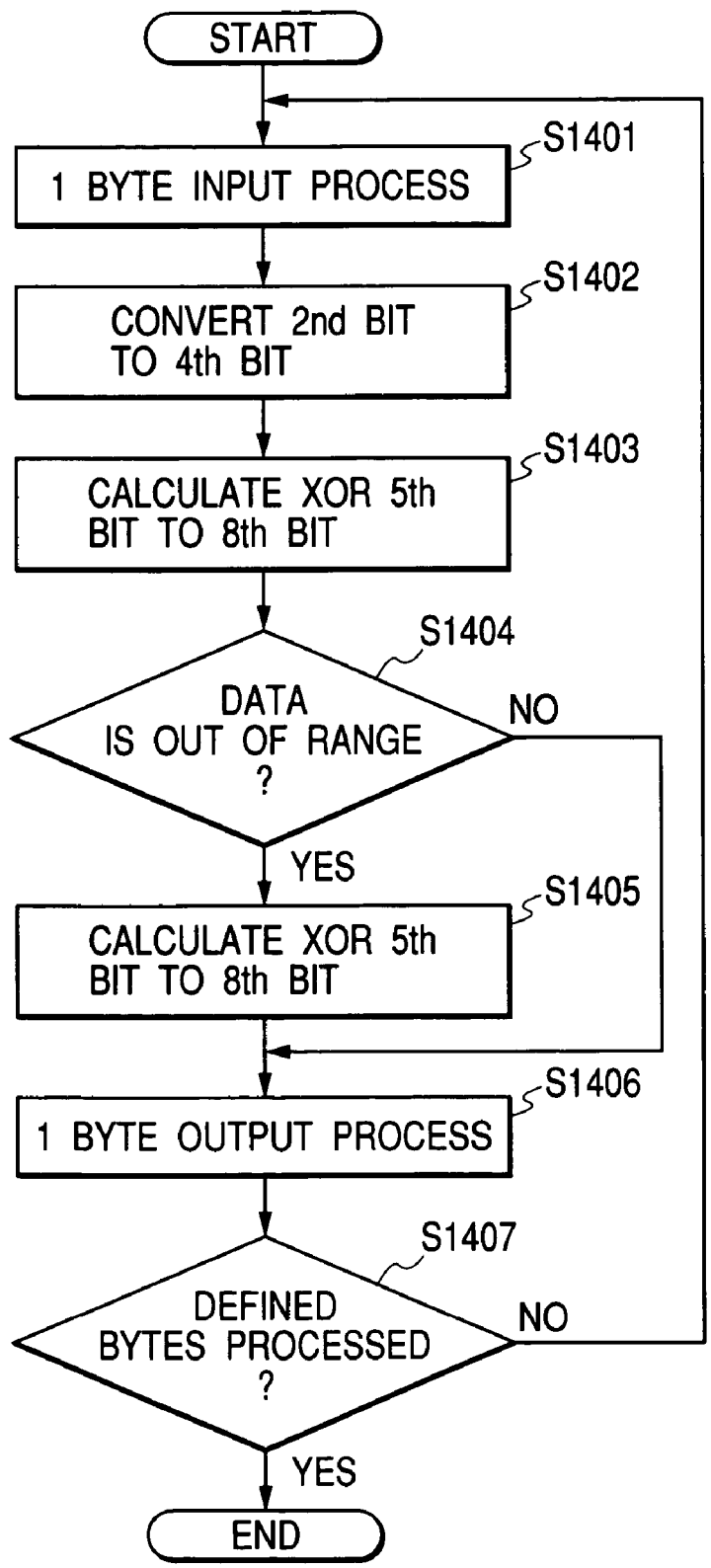
FIG. 25 is a flow chart showing an encryption process in the seventh embodiment.

The above-mentioned conversion method will be explained with reference to FIG. 25. At first a step S1401 enters encryption object data. A step S1402 executes a conversion process for 2nd to 4th bits among the input data. In this operation, the values of the 1st to 4th bits of the data 1202 are utilized, and the conversion is so made as not to change a bit having a value 1. Then a step S1403 processes 5th to 8th bits and applies an XOR process on the 5th to 8th bits of the data 1202. Then a step S1404 discriminates whether data out of range are present, and, if out of range, executes an XOR process as in the step S1403. A step S1406 discriminates whether all the encryption object data have been processed, and, if not, the flow is transferred to the step S1401. The flow is terminated in case the step S1406 identifies that the process has been completed.

The above-explained conversion process allows to satisfy the rule 1 and to achieve conversion into the defined value range of JPEG 2000.

In the following there will be explained still another method for conversion so as to meet following rule:

rule 2:
A) 00 to 7F are converted only to 00 to 7F;
B) 90 to EF are converted only to 90 to EE;
C) upper four bits are converted only from 8 to 8 and from F to F; and
D) lower four bits are converted only from F to F.

Figure 24:
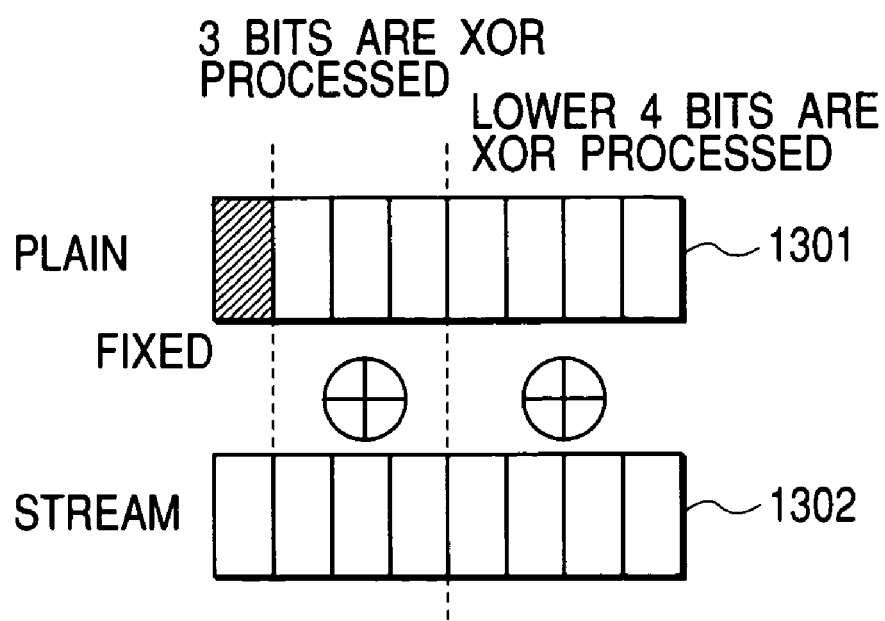
FIG. 24 is a conceptual view showing another conversion method in the seventh embodiment.

FIG. 24 represents a conversion method satisfying the rule 2, wherein 1301 represents bits of 1-byte (8-bit) data processed by the step S301 among the encryption object data. Also 1302 represents bits of 1-byte pseudo random number data subjected to an XOR data in the step S302.

Figure 26:
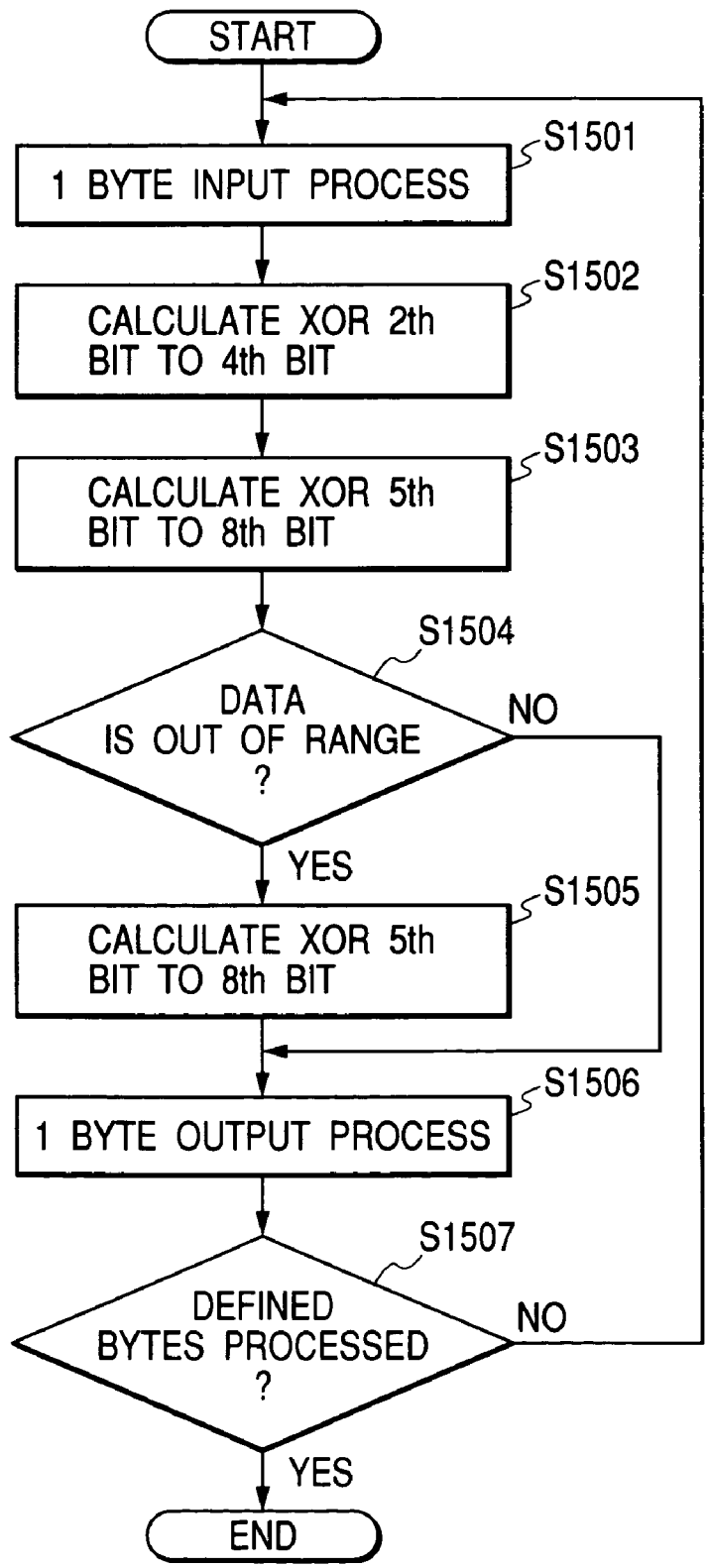
FIG. 26 is a flow chart showing another encryption process in the seventh embodiment.

The above-mentioned conversion method will be explained with reference to FIG. 26. At first a step S1501 enters encryption object data. Then a step S1502 processes 2nd to 4th bits, and applies an XOR process on the 2nd to 4th bits among the data 1302. Then a step S1503 processes 5th to 8th bits and applies an XOR process on the 5th to 8th bits of the data 1302. Then a step S1504 discriminates whether data out of range are present, and, if out of range, executes an XOR process as in the step S1502 or S1503. A step S1506 discriminates whether all the encryption object data have been processed, and, if not, the flow is transferred to the step S1501. The flow is terminated in case the step S1506 identifies that the process has been completed.

The above-explained conversion process allows to satisfy the rule 2 and to achieve conversion into the defined value range of JPEG 2000.

The present invention may be applied, within an extent of realizing the functions of the aforementioned embodiments, to a system constituted of plural equipment (for example a computer itself, an interface device, a display etc.) or an apparatus constituted of a single equipment.

The present invention also includes a case where program codes of a software realizing the functions of the aforementioned embodiments is supplied to a computer in a system or an apparatus connected with various devices in order to function such devices so as to realize the functions of the aforementioned embodiments and the functions of the aforementioned embodiments are realized by a computer (CPU or MPU) of the above-mentioned system or apparatus by reading and executing the program codes stored in the memory medium. In such case the program codes themselves read from a memory medium realize the functions of the aforementioned embodiments, and the program codes themselves, and means for supplying the computer with the program codes such as the memory medium storing the program codes constitutes the present invention.

The memory medium storing such program codes can be, for example, a floppy disk, a hard disk, an optical disk, a magnetooptical disk, a CD-ROM, a CD-R, a magnetic tape, a non-volatile memory card, or a ROM.

The present invention also includes not only a case where the functions of the aforementioned embodiments are realized by the execution of the program codes read by the computer but also a case where an operating system or an application software functioning on the computer realize the functions of the aforementioned embodiments under the control of such program codes.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof under the control of such program codes, thereby realizing the functions of the aforementioned embodiments.

In case applying the present invention to the aforementioned memory medium, such memory medium may store program codes corresponding to the aforementioned flow charts.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An encryption method comprising:
   an encryption step of encrypting an object code;
   an encryption result judgment step of judging whether a new code having a value within a predetermined range is generated as the result of encrypting the object code into an encrypted object code in said encryption step;
   an encryption result confirmation step which, in case said encryption result judgment step judges that a new code having a value within the predetermined range is not generated, confirms the encrypted object code as an encryption result of the object code; and
   a re-encryption step which, in case said encryption result judgment step judges that a new code having a value within the predetermined range is generated, re-encrypts the encrypted object code by performing the same encryption process as said encryption step.

2. An encryption method according to claim 1, wherein said judgment step includes:
   a first encryption result judgment step of judging whether said encryption object code is a new code having a value within a predetermined range; and
   a second encryption result judgment step of judging whether a concatenated result of an encrypted code immediately preceding said encrypted object code and said encrypted object code generates a new code having a value within said predetermined range.

3. An encryption method according to claim 1, wherein said encryption step executes an encryption for every predetermined number of codes.

4. An encryption method according to claim 1, wherein said encryption step executes encryption by a common key cipher method.

5. An encryption method according to claim 1, wherein the new code having a value within said predetermined range includes a part of marker codes in JPEG 2000.

6. A decryption method comprising:
   a decryption step for decrypting an object code;
   a decryption result judgment step of judging whether a new code having a value within a predetermined range is generated as the result of decrypting the object code into a decrypted object code in said decryption step;
   a decryption result confirmation step which, in case said decryption result judgment step judges that a new code having a value within the predetermined range is not generated, confirms the decrypted object code as a decryption result of the object code; and
   a re-decryption step which, in case said decryption result judgment step judges that a new code having a value within the predetermined range is generated, re-decrypts the decrypted object code by performing the same decryption process as said decryption step.

7. A decryption method according to claim 6, wherein said decryption result judgment step includes:
   a first decryption result judgment step of judging whether said decrypted object code is a new code having a value within a predetermined range; and
   a second decryption result judgment step of judging whether a concatenated result of a decrypted code immediately preceding said decrypted object code and said decrypted object code generates a new code having a value within said predetermined range.

8. A decryption method according to claim 6, wherein said decryption step executes a decryption for every predetermined number of codes.

9. A decryption method according to claim 6, wherein said decryption step executes decryption by a common key cipher method.

10. A decryption method according to claim 6, wherein the new code having a value within said predetermined range includes a part of marker codes in JPEG 2000.

11. An encryption apparatus comprising:
    a processor that executes program code, the executed program code controlling the apparatus to function as
    encryption means which encrypts an object code;
    encryption result judgment means which judges whether a new code having a value within a predetermined range is generated as the result of encrypting the object code into an encrypted object code;
    encryption result confirmation means which, in case said encryption result judgment means judges that a new code having a value within the predetermined range is not generated, confirms the encrypted object code as an encryption result of the object code; and
    re-encryption means which, in case said encryption result judgment means judges that a new code having a value within the predetermined range is generated, re-encrypts the encrypted object code by performing the same encryption process as said encryption means.

12. A decryption apparatus comprising:
    a processor that executes program code, the executed program code controlling the apparatus to function as
    decryption means which decrypts an object code; decryption result judgment means which judges whether a new code having a value within a predetermined range is generated as the result of decrypting the object code into a decrypted object code in said decryption means
    decryption result confirmation means which, in case said decryption result judgment means judges that a new code having a value within the predetermined range is not generated, confirms the decrypted object code as a decryption result of the object code; and
    re-decryption means which, in case said decryption result judgment means judges that a new code having a value within the predetermined range is generated, re-decrypts the decrypted object code by performing the same decryption process as said decryption means.

13. A computer readable program for encryption embodied in a computer-readable medium, comprising:
    an encryption step for encrypting a new code;
    an encryption result judgment step of judging whether a new code having a value within a predetermined range is generated as the result of encrypting the object code into an encrypted object code in said encryption step;

an encryption result confirmation step which, in case said encryption result judgment step judges that a new code having a value within the predetermined range is not generated, confirms the encrypted object code as an encryption result of the object code; and a re-encryption step which, in case said encryption result judgment step judges that a new code having a value within the predetermined range is generated, re-encrypts the encrypted object code by performing the same encryption process as said encryption step.

14. A computer readable program for decryption embodied in a computer-readable medium, comprising:

a decryption step of decrypting a new code; a decryption result judgment step of judging whether a new code having a value within a predetermined range is generated as the result of decrypting the object code into a decrypted object code in said decryption step;

a decryption result confirmation step which, in case said decryption result judgment step judges that a new code having a value within the predetermined range is not generated confirms the decrypted object code as a decryption result of the object code; and a re-decryption step which, in case said decryption result judgment step judges that a new code having a value within the predetermined range is generated, re-decrypts the decrypted object code by performing the same decryption process as said decryption step.

* * * * *